United States Patent
Zhao et al.

(10) Patent No.: US 10,705,706 B2
(45) Date of Patent: Jul. 7, 2020

(54) METHODS AND APPARATUS FOR MULTIMEDIA PRESENTATION

(71) Applicant: Massachusetts Institute of Technology, Cambridge, MA (US)

(72) Inventors: Nan Zhao, Cambridge, MA (US); Asaph Azaria, New York, NY (US); Joseph Paradiso, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 50 days.

(21) Appl. No.: 15/912,950

(22) Filed: Mar. 6, 2018

(65) Prior Publication Data
US 2018/0253222 A1    Sep. 6, 2018

Related U.S. Application Data

(60) Provisional application No. 62/467,585, filed on Mar. 6, 2017, provisional application No. 62/551,188, filed on Aug. 28, 2017, provisional application No. 62/578,019, filed on Oct. 27, 2017.

(51) Int. Cl.
*G06F 3/0484* (2013.01)
*G06F 3/0481* (2013.01)

(52) U.S. Cl.
CPC ........ *G06F 3/04847* (2013.01); *G06F 3/0481* (2013.01)

(58) Field of Classification Search
CPC .................. G06F 3/0481; G06F 3/04847
See application file for complete search history.

(56) References Cited

U.S. PATENT DOCUMENTS

| 9,772,613 B1 * | 9/2017 | Webster ................. G05B 15/02 |
| 2009/0013048 A1 | 1/2009 | Partaker et al. |
| 2013/0166042 A1 | 6/2013 | Sharma et al. |
| 2015/0033266 A1 | 1/2015 | Klappert et al. |

(Continued)

OTHER PUBLICATIONS

Zhao, N., et al., A Multidimensional Continuous Contextual Lighting Control System Using Google Glass; published in Proceedings of the 2nd ACM International Conference on Embedded Systems for Energy-Efficient Built Environments, BuildSys 2015, pp. 235-244, Nov. 2015, ACM New York, NY, USA.

(Continued)

*Primary Examiner* — Stephen S Hong
*Assistant Examiner* — Nicholas Hasty
(74) *Attorney, Agent, or Firm* — Stephen R. Otis

(57) ABSTRACT

Closed loop control of a multimedia system may be achieved with a control space that includes at least two control axes. In each control axis, a coordinate on the axis may indicate a degree to which a multimedia scene facilitates or is perceived to facilitate a user state or a degree to which the user state is achieved. For example, the two control axes may be focus and restoration. A user may provide input that specifies a target state. The target state may be different than, or the same as, the user's current state. The system may select a scene that has coordinates, in the control space, that are closest, by at least a threshold, to the target state, and present the scene to the user. Sensors in the system may measure a user state that results from presenting the scene. The system may revise the scene's coordinates accordingly.

20 Claims, 16 Drawing Sheets

(56) References Cited

U.S. PATENT DOCUMENTS

2015/0067708 A1* 3/2015 Jensen .............. H04N 21/4756 725/10

OTHER PUBLICATIONS

Chen, Y., et al., Media adaptation framework in biofeedback system for stroke patient rehabilitation; published in Proceedings of the 15th ACM international conference on Multimedia, pp. 47-57, Sep. 2007.

Jain, R., et al., The P2 algorithm for dynamic calculation of quantiles and histograms without storing observations; published in Communications of the ACM, vol. 28 Issue 10, Oct. 1985, pp. 1076-1085.

Jones, B., et al., IllumiRoom: Peripheral Projected Illusions for Interactive Experiences; published in CHI '13 Proceedings of the SIGCHI Conference on Human Factors in Computing Systems, 2013.

Leon, E., et al., Affect-aware behaviour modelling and control inside an intelligent environment; published in Pervasive and Mobile Computing, vol. 6, Issue 5, Oct. 2010, pp. 559-574.

Mott, M., et al. Illuminating the Effects of Dynamic Lighting on Student Learning; published in SAGE Open, vol. 2, issue 2, May 2012.

Schnadelbach, H., et al., ExoBuilding: breathing life into architecture; published in Proceedings of NordiChi 2010.

Tarantola, A., Philips Hue Lightning Review: Your Lamp's Not Worthy (Updated); published in gizmodo.com, Apr. 2013; accessed online on May 18, 2018 at https://gizmodo.com/5994183/philips-hue-lightning-review-your-lamps-not-worthy.

Vastengurg, M., et al., A user experience-based approach to home atmosphere control; published in Universal Access in the Information Society, Jun. 2007, vol. 6, Issue 1, pp. 1-13.

* cited by examiner

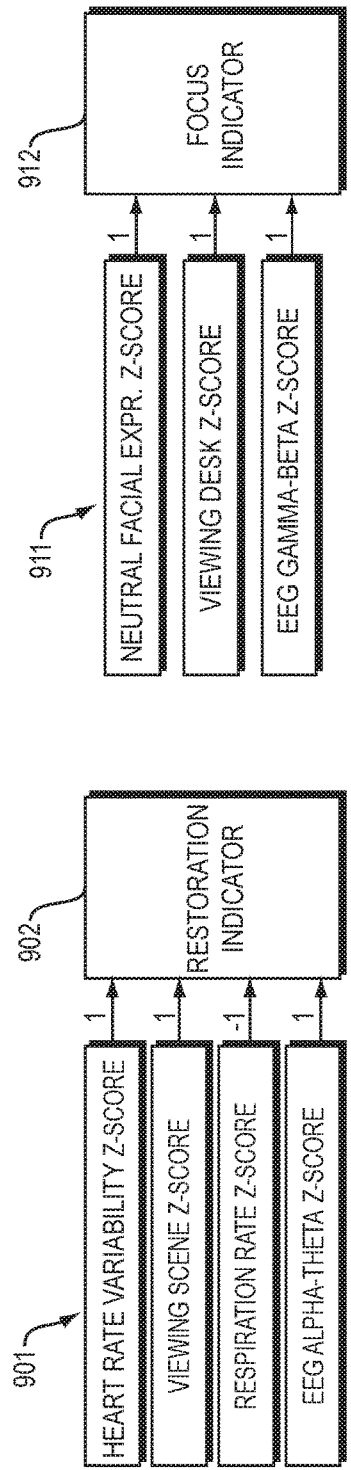
FIG. 9A
FIG. 9B
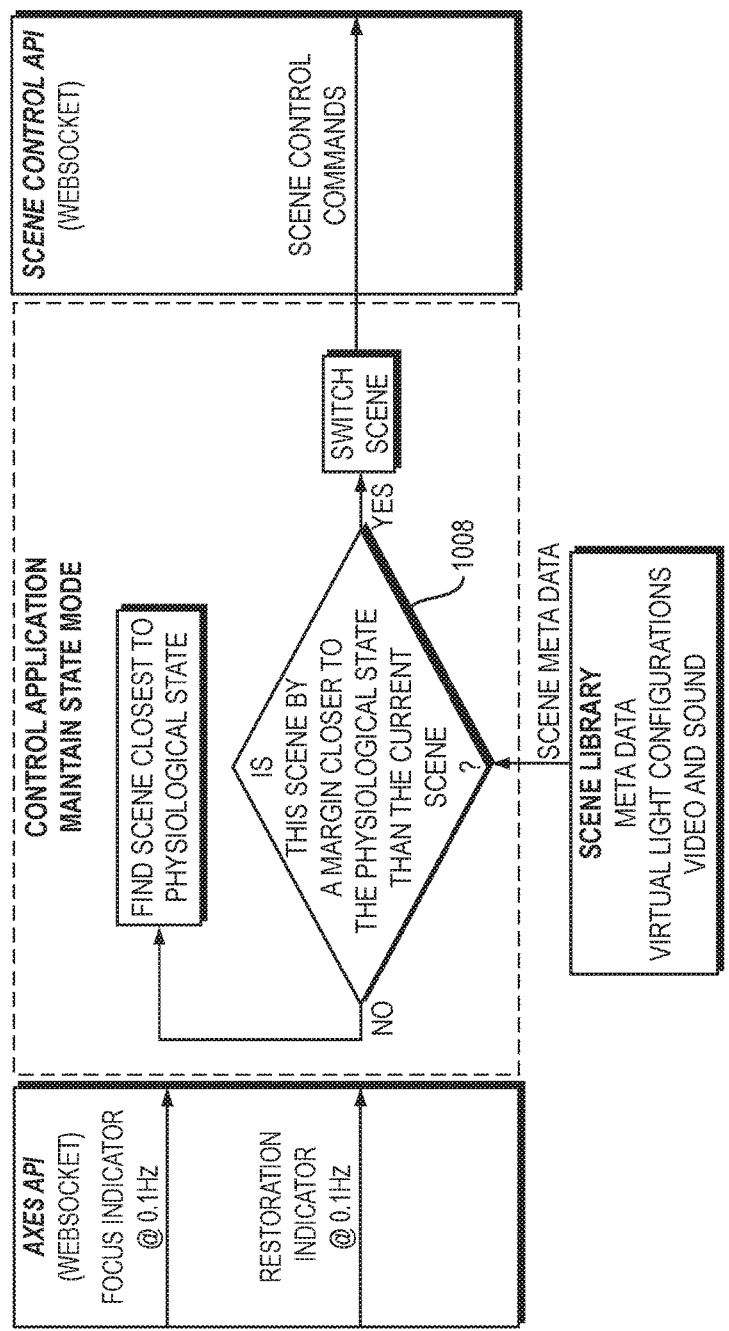
FIG. 10

METHODS AND APPARATUS FOR MULTIMEDIA PRESENTATION

RELATED APPLICATIONS

This application claims the benefit of U.S. Provisional Application No. 62/467,585 filed Mar. 6, 2017, U.S. Provisional Application No. 62/551,188 filed Aug. 28, 2017, and U.S. Provisional Application No. 62/578,019 filed Oct. 27, 2017 (collectively, the "Provisionals").

FIELD OF TECHNOLOGY

The present invention relates generally to multimedia systems.

SUMMARY

In illustrative implementations of this invention, closed loop control of a multimedia system is achieved with a control space that includes at least two control axes. The control axes may be contextual control axes. For example, the control axes may relate to a context in which the multimedia presentation is being made—such as whether the user is trying to focus on a mentally demanding task or wants to relax. In some implementations, a coordinate on a control axis may indicate: (a) a degree to which a multimedia scene facilitates or is perceived to facilitate a specific user state; or (b) a degree to which the specific user state is achieved.

In some cases, the two control axes are focus and restoration.

The multimedia system may output multimedia scenes. Each of the scenes may include video, sound and room lighting. The system may store a set of multimedia scenes.

The user may provide input that specifies a target user state. The target state may be different than, or the same as, the user's current state.

The system may associate the target state with coordinates in the control space (which has at least two control axes). For instance, if the coordinate axes are focus and restoration, then the system may assign, to a particular target user state, coordinates (0.1, 0.8) in the control space—that is, 0.1 on the focus axis and 0.8 on the restoration axis. Also, the system may associate each of the stored scenes, respectively, with coordinates in the control space. For instance, if the coordinate axes are focus and restoration, then the system may assign, to a particular stored multimedia scene, coordinates (−0.3, 0.7) in the control space—that is, −0.3 on the focus axis and 0.7 on the restoration axis.

After the user selects the target state, the system may select a first scene in the set of stored scenes that is closer (in the control space) to the target scene than is any other scene in the set of stored scenes. The system may then begin presenting the first scene. However, in some implementations, to avoid instability, the system transitions to the first scene only if the first scene is closer—by a threshold amount—to the target than is the current scene being presented by the system.

In illustrative implementations, sensors measure how the user responds to the first scene. For instance, sensors may measure a user state while the first scene is being presented to the user. The system may revise the first scene's coordinates (in the control space), based on the sensor measurements. For example, if presenting the first scene causes the user state to move to (and linger at) new coordinates (in the control space) that are different than the assigned coordinates of the first scene, then the system may revise the coordinates of the first scene by changing them to the new coordinates. If this revision causes the first scene's coordinates to move further from the target, then the system may select a second scene that: (a) is different than the first scene; (b) is closer to the target scene than is any other scene in the set of stored scenes; and (c) is closer—by at least a threshold amount—to the target than is the first scene. The system may then cease to present the first scene and begin to present the second scene to the user. All coordinates and distances in this paragraph and the preceding paragraph are coordinates and distances in the control space.

This invention has many practical advantages. For example, in some implementations, the control axes allow a user to control a multimedia system in accordance with categories (e.g., focus and restoration) by which the user actually perceives scenes generated by the system, rather than categories that conventionally describe transducer output of the system (such as color temperature or lux of room lighting, or specific content of audiovisual presentations). Also, for example, the sensor feedback may enable the system to dynamically adjust to a particular user, based on how that user actually responds to scenes generated by the system.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the description of this invention in the Field of Technology section is not limiting; instead it identifies, in a general, non-exclusive manner, a field of technology to which some implementations of this invention generally relate.

BRIEF DESCRIPTION OF THE DRAWINGS

FIGS. 6A, 6B and 6C are a perspective view, top view and side view, respectively, of the room.

FIG. 9A shows features that are derived from sensor readings and that are employed to determine a restoration indicator.

FIG. 9B shows features that are derived from sensor readings and that are employed to determine a focus indicator.

FIG. 10 illustrates a Maintain State mode of closed loop control.

Figure 1A:
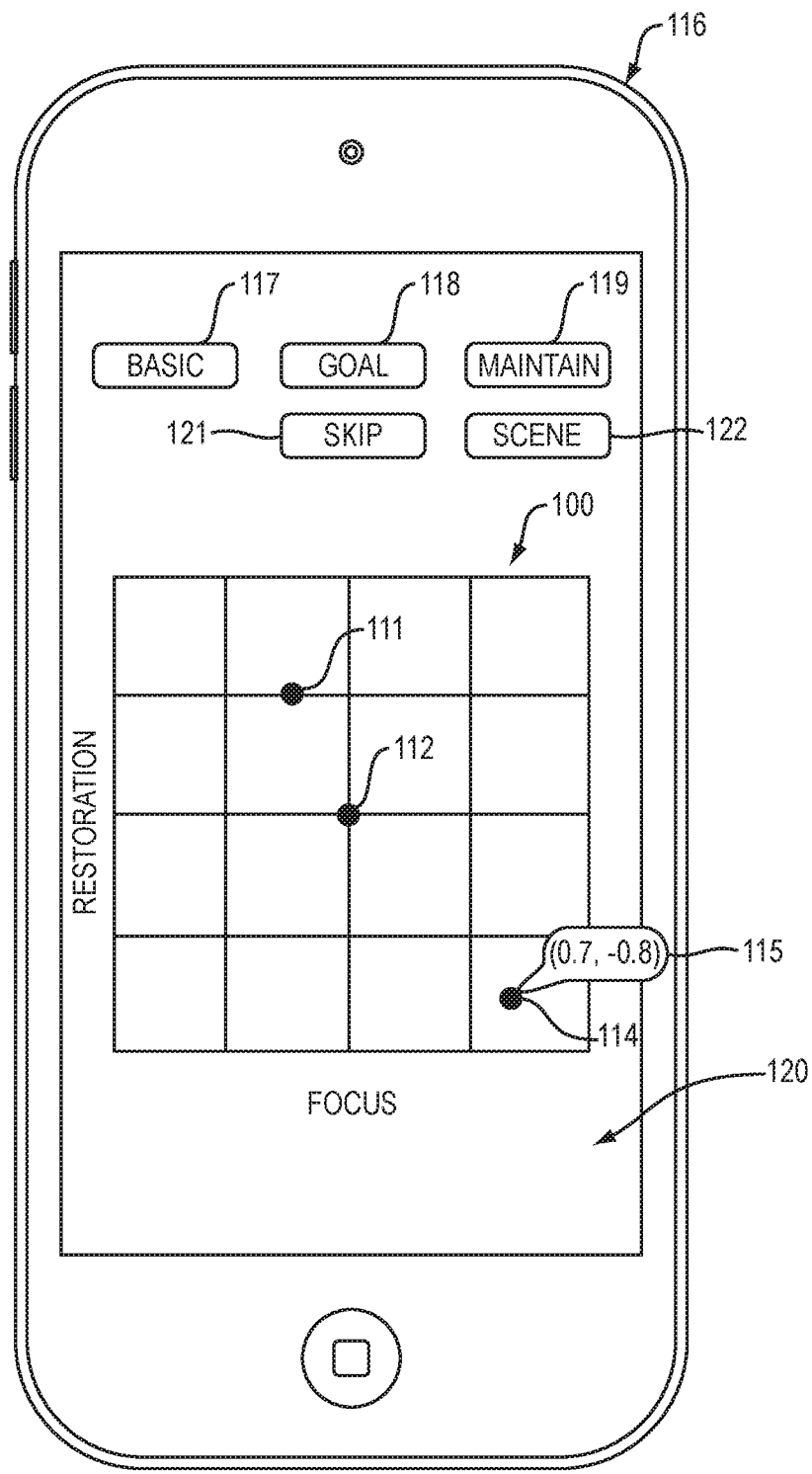
FIG. 1A shows a GUI (graphical user interface) for controlling a multimedia presentation.

The above Figures show some illustrative implementations of this invention. The examples shown in the above Figures do not limit this invention. This invention may be implemented in many other ways.

DETAILED DESCRIPTION

General

In some implementations of this invention, a multimedia system comprises: (a) one or more luminaires; (b) a projector or an electronic visual display screen; (c) one or more speakers; (d) one or more sensors; and (e) one or more computers.

The multimedia system may be controlled with a control space that includes at least two control axes. The control axes may be contextual control axes. For example, the control axes may relate to a context in which the multimedia presentation is being made—such as whether the user is trying to focus on a mentally demanding task or wants to relax. In some implementations, a coordinate on a control axis may indicate: (a) a degree to which a multimedia scene facilitates or is perceived to facilitate a specific user state; or (b) a degree to which the specific user state is achieved.

In some implementations, the coordinates (in a control space) of a multimedia scene are revised based on sensor feedback. This feedback may enable the system to customize its output for each user. For instance, the sensor feedback may enable the system to learn, for each individual user, which multimedia scene is actually closest (for that user) to a target state—and to adjust accordingly which multimedia scene it presents to that user.

In illustrative implementations, a system outputs a multimedia presentation (or scene) that includes video, sound and room lighting.

In some use scenarios, a multimedia presentation is perceived by a user as an atmosphere that is conducive to focus, or an atmosphere that is perceived by a user as restorative.

For example, the multimedia system may create, in a room, a "forest" scene that is usually perceived by users as both restorative and conducive to focus. The "forest" scene may include: (a) a video of a forest scene with little movement in the video; (b) low room lighting (e.g., 250 lux on a desk at which a user is sitting) with 3500° Kelvin color temperature; and (c) a sound track of forest and river noises.

Or, for example, the multimedia system may create, in a room, a "library" scene that is usually perceived by users as conducive to focus but not restorative. The "library" scene may include: (a) a video of a study room in a library, with little movement in the video; (b) bright room lighting (e.g., 1000 lux on a desk at which a user is sitting) with 5500° Kelvin color temperature; and (c) a sound track of library noises (such as flipping pages).

Or, for example, the multimedia system may create, in a room, a "kites" scene that is usually perceived by users as restorative but not conducive to focus. The "kites" scene may include: (a) a video of three kites against a blue sky, with a large amount of movement in the video; (b) medium-bright room lighting (e.g., 800 lux on a desk at which a user is sitting) with 9000° Kelvin color temperature; and (c) a sound track of ocean waves crashing against a shore.

Or, for example, the multimedia system may create, in a room, a "city" scene that is usually perceived by users as neither restorative nor conducive to focus. The "city" scene may include: (a) a video of crowds of pedestrians in a city, with a large amount of movement in the video; (b) bright room lighting (e.g., 1000 lux on a desk at which a user is sitting) with 6500° Kelvin color temperature; and (c) a sound track of city noises, including sound from streets and from inside stores.

In some implementations, the two control axes are focus and restoration. For a given scene, values along the "focus" axis of the 2D control space may indicate the degree to which users perceive the scene as being conducive to the users' ability to focus. Likewise, for a given scene, values along the "restoration" axis of the 2D control space may be indicative the degree to which users perceive the scene as being restorative (e.g., relaxing or casual or associated with a break from work).

In some implementations, the control axes of the control space are derived, or have been previously derived, from a higher dimensional space of observations of scenes outputted by a multimedia system. For example, in some cases, the Restoration and Focus axes of a 2D control space are derived, or have been derived, by PCA (principal component analysis) from a high dimensional set of observations of scenes. For instance, the observations may be observations of different scenes outputted by the multimedia system. These observations may comprise: (a) user ratings of the scene; or (b) sensor measurements of the scene.

Each scene (i.e., each multimedia presentation) may be assigned values in both dimensions of the control space. For example, in an illustrative use scenario: (a) a 2D control space has two axes, focus and restoration; (b) values on each axis range from −1 to +1; and (c) based on user ratings, a "forest" scene may be assigned a value of (0.25, 0.5), that is, 0.25 on the focus axis and 0.5 on the restoration axis.

Likewise, a specific group of settings for a multimedia system (that result in a specific scene being created) may be assigned a value along each of the control axes, respectively. In some cases, a multimedia system includes many different transducers each with many different outputs, and thus the settings space (of multimedia settings that produce specific scenes) has more dimensions than the two-axis control system.

In some implementations, sensor readings are taken to determine a user's state. For example, these sensor readings may comprise measurements regarding the user's heart rate variability (HRV), head orientation (e.g., head looking up at video screen or down at desk), facial expression, respiration rate, and electrical activity in the brain. Based on these sensor readings, a computer may calculate a focus indicator and a restoration indicator. The focus indicator may indicate the extent to which a user is focusing. The restoration indicator may indicate the extent to which the user is in a casual or relaxed mood.

In some cases, a specific combination of sensor readings that are indicative of a user's state may be associated with a point in the 2D control space. For example, in an illustrative use scenario: (a) a 2D control space has two axes, focus and restoration; (b) values on each axis range from −1 to +1; (c) sensor readings are taken of a user; (d) these sensor readings comprise a specific combination of values of HRV, head orientation, facial expression, respiration rate and brain electrical activity of the user; and (e) this specific combination of sensor readings may be assigned a value of (0.5, −0.2) in the 2D control space, that is, 0.5 along the focus axis and −0.2 along the restoration axis.

In some implementations, the sensor system includes multiple types of sensors, and the sensor space (of sensor readings) has more dimensions than the two-dimensional control space.

In some implementations, open loop control of the multimedia system is performed via a two-dimensional control space. For example, in an implementation with open loop control: (a) a user may select a point in the 2D control space; (b) the multimedia system may determine which stored scene in the system's scene library has coordinates (in the 2D control space) closest to the user-selected point; and (b) the multimedia system may begin to output this closest scene.

Here is a non-limiting example of open loop control, in an illustrative implementation of this invention: (a) a multimedia system has a 2D control space with two control axes; (b) the two control axes are focus and restoration; (c) a user selects point (0.64, 0.45) in the 2D control space, that is, selects 0.64 on the focus axis and 0.45 on the restoration axis; (d) the multimedia system determines which scene, in its stored scene library, has coordinates (in the 2D control space) that are closest to the user-selected point of (0.64, 0.45), and concludes that a stored "poppy" scene (which has coordinates in the 2D control space of (0.756, 0.698)) is the closest scene; and (d) the multimedia system transitions its output to the poppy scene, by fading out the current scene, briefly displaying a neutral scene, and then fading in the poppy scene.

In the preceding example of open loop control, no sensor readings are taken, or if they are taken, they are not a factor in the open loop control.

Thus, the open loop control may, in some cases, fail to adjust for individual differences among users. For instance, in the preceding example: (a) the (0.756, 0.698) coordinates of the poppy scene (in the 2D control space) may be based on average user ratings provided by a large group of users; (b) for the particular user who made the selection, the poppy scene may actually have coordinates of (−0.19, 0.42); (c) for the particular user who made the selection, a "river" scene may actually have coordinates (in the 2D control space) that are closer to user-selected point than the poppy scene is; but (d) the system would continue to output the poppy scene anyway. Thus, in some cases, because open loop control fails to adjust to an individual user's actual response to a scene, open loop control may fail to induce the desired state in the user.

In some implementations, closed loop control of the multimedia system is performed via a two-dimensional control space. Advantageously, the open loop control may adjust to an individual user's actual response to a scene, and thus may more accurately achieve a user's goal.

In some implementations, closed loop control may be performed in either: (a) "Maintain State" mode; or (b) "Goal" mode.

In some use scenarios, when a user selects "Maintain State" mode, the user is instructing the multimedia system to output scenes which help the user to remain in the user's current state—i.e., which help the user to remain in the user's state as of the time that the user selects "Maintain State" mode.

In some use scenarios, when a user selects "Goal" mode and selects a target user state, the user is instructing the multimedia system to output scenes which help the user to achieve a goal—specifically, to achieve the target user state.

In both modes, the user may, at least implicitly, select a target user state.

In the "Maintain State" mode, the target may be the user's current state—i.e., the user's state when the user selects "Maintain State" mode. In the "Maintain State" mode, the user typically does not explicitly specify the coordinates (in the control space) of the target. This is because, in the "Maintain State" mode: (a) the target may be the user's current state when the mode is selected; (b) sensors may take measurements of the user; (c) based on these measurements, the system may detect this current user state; and (d) the system may associate this current user state with coordinates in the control space.

In contrast, in the "Goal" mode, the user may explicitly select a specific target state. In the "Goal" mode, the target is typically different than the user's current state (when the user specifies the target's coordinates).

In both of these modes of closed loop control, the multimedia system may determine the coordinates (in the control space) of the target state. As noted above, in "Maintain State" mode, the target state may be the user's state as of when the mode is selected, and the coordinates (in the control space) of this target may be automatically determined from sensor readings regarding the user. In the "Goal" mode, the user may explicitly select coordinates (in the control space) of the target state. Or, in "Goal" mode, the user may explicitly select a target state and the system may associate the target with specific coordinates in the control space.

In both of these modes of closed loop control, after the coordinates of the target user state are determined, the system selects the stored scene in the system's scene library that has coordinates (in the 2D control space) that are closer to the coordinates of the target state than those of any other scene in the library; and (c) then begins to output this scene (e.g., by fading out a current scene, briefly displaying a neutral scene, and then fading in this scene that is closest to the user's current state). To prevent instabilities due to frequent changes in scenes, hysteresis may be employed. For example, in some implementations, the system transitions from a first scene to a second scene only if the second scene is closer—by at least a threshold amount—to the target state than is the first scene.

In some implementations, a user who has selected Goal mode may instruct the multimedia system to quickly transition (skip) to a scene that the user thinks is close to the target state, and then to continue with Goal mode.

In some implementations, a user may select either Maintain State mode or Goal mode, and may change this selection at any time. In some cases, in the Goal mode, the user may change or set the target state at any time.

In closed loop control, the coordinates (in the 2D control space) that are assigned by the system to a particular scene may be adjusted based on feedback from sensors. For example, in some implementations, sensors may measure a user state that results from presenting a specific scene. The system may revise the specific scene's coordinates, based on the sensor measurements. If this revision causes the scene's coordinates to move further from the target, then the system may select (and present to the user) a different scene, that is closer, by at least a specified threshold, to the target.

For instance, in the Goal mode, if a specific scene causes a user's state to move in a direction that is not toward the assigned coordinates of the specific scene, then the system may revise the coordinates of the scene. Here is a non-limiting example of revising coordinates of a scene, in the Goal mode: (a) A user whose current state is (0,0) selects a target state that is (0.5, 1); (b) the system displays scene X which has coordinates of (0.5, 0.9), to try to move user's state closer to the target; (c) scene X does not have the expected effect, but instead causes the user's state to change to (−0.2, 0.4); (d) the system revises the coordinates of scene X to (−0.2, 0.4); and (e) the system then displays another scene, whose coordinates are closer—by at least a threshold amount—to the target than are the revised coordinates of Scene X. In this paragraph, all of the coordinates and distances are in a 2D control space.

Likewise, in the Maintain State mode, if a specific scene causes a user's state to move in a direction that is not toward the assigned coordinates of the specific scene, then the system may revise the coordinates of the scene. Here is a non-limiting example of revising coordinates of a scene, in the Maintain State mode: (a) A user whose state is (0,0) selects Maintain State mode; (b) the system displays scene Y which has coordinates of (0.015, 0.120) because the coordinates of scene Y are closer to the user's current state (0,0) than are the coordinates of any other scene in the system's scene library; (c) scene Y does not have the expected effect, but instead causes the user's state to change to (−0.8, 0.6); (d) the system revises the coordinates of scene Y to (−0.8, 0.6); and (e) the system then displays another scene, whose coordinates are closer—by at least a threshold amount—to (0,0) than are the revised coordinates of Scene Y. Recall that, in this example, the state that the user is trying to maintain is (0,0). Again, in this paragraph, all of the coordinates and distances are in a 2D control space.

In some implementations, scene coordinates (in the 2D control space) are initially assigned by the multimedia system based on user ratings from a group of users.

In some cases, coordinates (in the 2D control space) that are assigned to scenes or to particular sets of sensor readings may be customized for individual users.

For a specific user, the coordinates (in the 2D control space) that are assigned to a particular scene may be revised based on sensor readings regarding that user which are taken while the scene is presented to that user (as described above). Or, the coordinates (in the 2D control space) that are assigned to a particular scene may be revised for a specific user based on user ratings (regarding the specific scene) provided by the specific user in response to a survey.

In some implementations, a multimedia system associates a specific scene with specific coordinates in a control space by accessing a database or lookup table that stores an association (e.g., mapping) between the specific scene and the specific coordinates. For instance, the scene may comprise a particular combination of simultaneous video, audio and room lighting outputted by the multimedia system (e.g., the "forest" scene, "library" scene, "kites" scene, or "city" scene described above).

Likewise, in some implementations, a multimedia system associates a specific permutation of settings of multimedia transducers (that result in a specific scene being outputted by the system) with specific coordinates in a control space by accessing a database or lookup table that stores an association (e.g., mapping) between the specific permutation of multimedia transducers and the specific coordinates.

Likewise, in some implementations, a multimedia system associates a specific permutation of sensor readings regarding a user with specific coordinates in a control space by accessing a database or lookup table that stores an association (e.g., mapping) between the specific permutation of sensor readings and the specific coordinates.

Likewise, in some implementations, a multimedia system associates a specific user state with specific coordinates in a control space by accessing a database or lookup table that stores an association (e.g., mapping) between the specific user state and the specific coordinates.

In some implementations, the database or lookup table (which stores associations) is stored in a local memory device inside the memory system. In other cases, the database or lookup table is stored remotely from the system, and the system accesses the database or lookup table via a network such as the Internet.

In some implementations, all or part of the content of scenes in a scene library is stored in a local memory device inside the memory system. In other cases, all or part of the content of scenes in a scene library is stored remotely from the system, and the system accesses this remotely stored content via a network such as the Internet.

In some cases, the system calculates an association between a specific scene (or state) and coordinates in the control space, without accessing a database (or lookup table) that stores the association.

In some implementations, one or more I/O (input/output) devices display a graphical user interface (GUI). For example, the GUI may display a 2D chart with a vertical axis of Restoration and a horizontal axis of Focus, and a user may select a point on the chart to indicate the target values of Restoration and Focus, respectively. The GUI may display, on the 2D chart, points that correspond to one or more of the following: the user's current state, a target state, and a scene. Alternatively, instead of a 2D chart: (a) the GUI may display two sliders, one for Restoration and the other for Focus; and (b) the user may slide (via the GUI) each of the displayed sliders to a desired position to indicate the target values of Restoration and Focus, respectively.

In some cases, the I/O device that displays the GUI may comprise a touch screen (e.g., in a smartphone). Or, for example, the GUI may be created by a set of I/O devices that include one or more of the following: a display screen or a touch screen (e.g., of a personal computer, tablet, or laptop computer), a keyboard, and a mouse.

In some cases, moving the scene closer (in the control space) to a target is achieved by modifying a scene, rather than selecting a new scene altogether. For instance, video or audio components of a scene may be "virtual", in the sense of being computer-generated, rather than being a recording of physical environment (visual or acoustic). In some cases, a virtual scene is modified, in order to move the scene closer (in the control space) to target coordinates.

Here are some non-limiting examples of how the multimedia system may automatically modify a scene, in order to present a modified scene that is closer to a target.

In some cases, the video portion of a scene may be modified: (a) by varying the blurriness of the video (and thus varying the level of detail that a user sees in the video); (b) causing new visual events to occur in the video, such as animal walking through an environment shown in the video; (c) changing the time at which (or how often) a particular visual events occurs in the video; (d) superimposing a pattern (such as brushstrokes or a geometric pattern) on the scene or varying a pattern that is superimposed on the scene; or (e) selecting a different video.

In some cases, the audio portion of a scene is modified: (a) by changing the amount or type of reverberation or echo in the sound track, and thus affecting the perceived size of a room; (b) by adding a new acoustic event, such as a bird call; (c) by modifying when or how often an acoustic event occurs (such as how often a bird call occurs); (d) by altering volume, (e) by altering relative volumes of bass, middle and treble frequencies; or (f) by selecting a different sound track.

In some cases, the room lighting portion of a scene is modified by changing color temperature, intensity, or spatial pattern of room illumination.

In some cases, a scene (or a video, audio or room lighting portion of a scene) is modified in response to changes in the user's activity (e.g., user changes from being quiet to talking to another person) or to changes in the user's environment (e.g., a phone rings or door opens). One or more sensors (e.g., cameras, accelerometers or microphones) may detect changes in user activity or changes in the user's environment.

In some cases, a multimedia system employs, for each individual user, multiple user models, one model at a time. For example, the system may employ a first user model at a first time of day and a second user model at a second time of day. Or, for instance, the system may employ a first user model when the user is engaged in a first activity and a second user model when the user is engaged in a second activity. Each user model may specify associations (or mappings) between: (a) scenes and coordinates in a control space; or (b) sensor readings (or user states) and coordinates in a control space; or (c) both. Changing from one user model to another may cause these associations (or mappings) to vary. For instance, changing from a first user model for a specific person to a second user model for the specific person may change which coordinates in the control space are associated with a specific scene, or may change which coordinates in the control space are associated with a specific set of sensor readings.

This invention may be implemented in many other ways.

For example, this invention is not limited to the scenes described above. The multimedia system may output any other scene (e.g., a scene of a mountain or of a sports race).

This invention is not limited to the control axes of Restoration and Focus. Any other control axes may be employed.

For example, in some cases, one of the control axes is a "creativity" axis. Coordinates on the creativity axis may be indicative of the extent to which a scene facilitates or is perceived to facilitate creativity or of the extent to which a user has attained a creative state. In some cases, the control space includes a "creativity" axis and one, two, three or more other control axes. For instance, a control space may have three control axes for focus, restoration and creativity, respectively.

Also, for example, in an exercise studio with weight-lifting equipment, user's perceptions of a scene may be best described by Energy and Persistence axes (the Energy axis being indicative of how energetic the scene is perceived to be, and the Persistence axis being indicative of how much the scene encourages the user to persist even when muscles are tired).

The number of dimensions in the control space may be different than two. For example, in some cases, the number of dimensions in the control space may be one, two, three, four, five, or more than five.

In some implementations, the multimedia system may include: (a) speakers or earphones that output sound; (b) a projector or an electronic visual display screen that displays a video; and (c) luminaires (e.g., ceiling or wall lights, or lamps) that create room lighting.

This invention is not limited to multimedia presentations that are perceptible to multiple users in a room. In some cases, at least a portion of the multimedia presentation is perceptible to only one user. For example, in some cases, sound is presented to a specific user by earphones, or at least a portion of a video or room lighting is displayed to the specific user by an Augmented Reality headset or by a Virtual Reality headset. In some use scenarios, the multimedia presentation occurs outdoors, rather than in an indoor room.

Graphical User Interface

FIG. 1A shows a graphical user interface (GUI) for controlling a multimedia presentation. The GUI may accept input from the user (e.g., user instructions or user ratings). Furthermore, the GUI may display information about the current state of the multimedia system or the current state of the user.

In the example shown in FIG. 1A, an input/output (I/O) device 116 includes a screen 120 that displays a GUI. The GUI displays a chart 100 that represents a 2D control space with two control dimensions: Restoration and Focus.

Figure 2A:
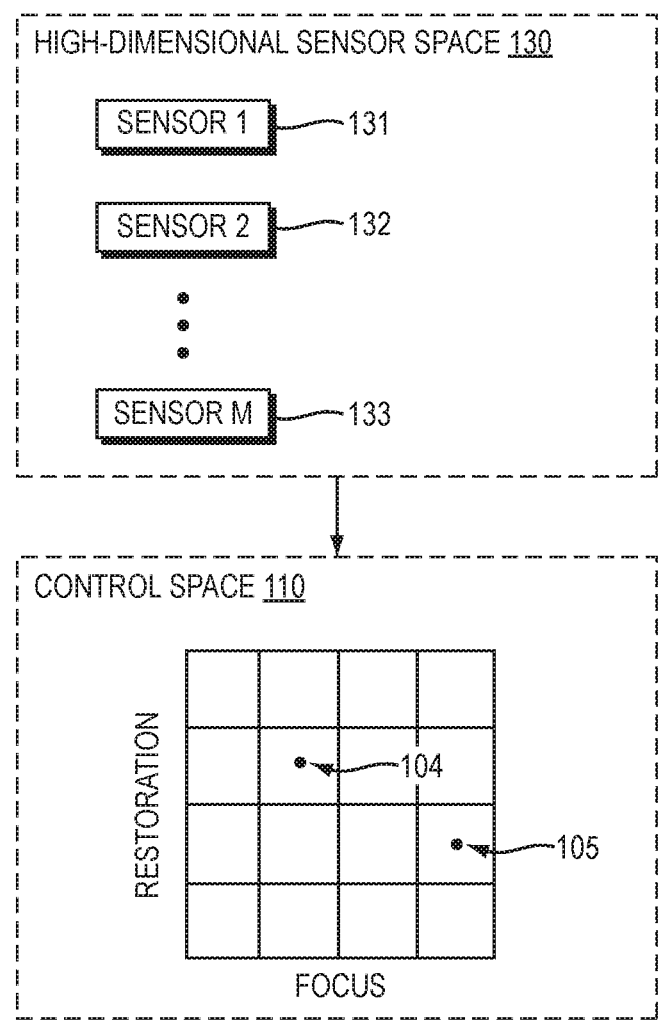
FIG. 2A shows a two-dimensional description of a user's state (in terms of Focus and Restoration) which is calculated from sensor readings.
Figure 3A:
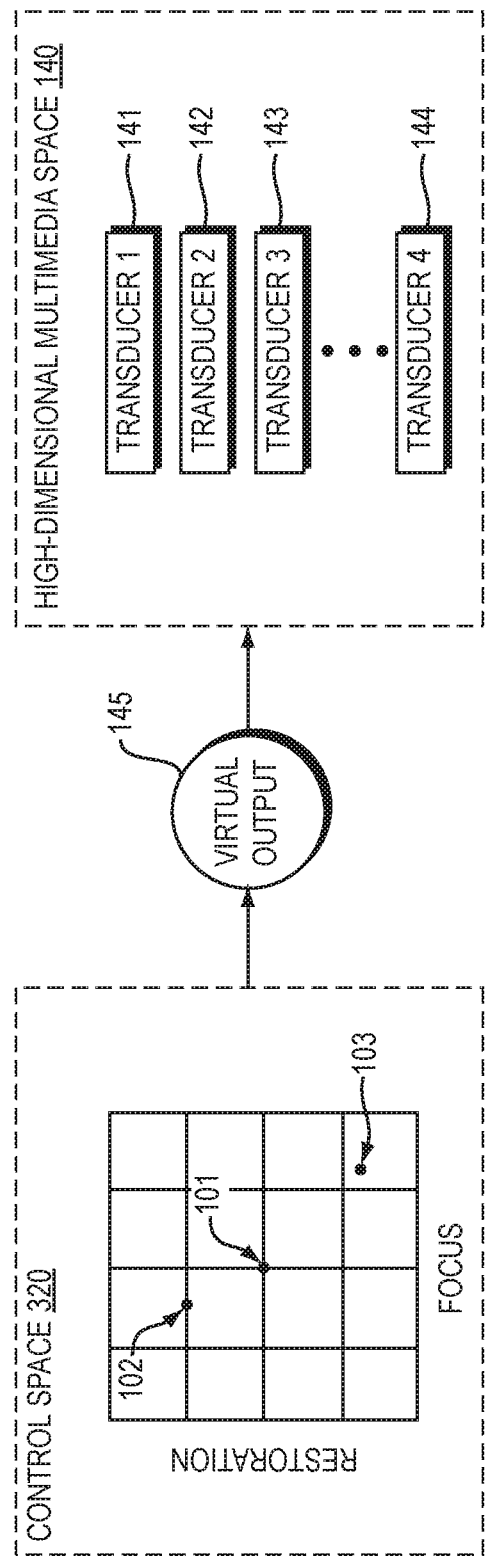
FIG. 3A shows a two-dimensional control space that is employed to control a higher dimensional set of multimedia outputs.

In FIGS. 1A, 2A and 3A: (a) each dimension in the 2D control space has a range of −1.0 to +1.0; and (b) the center point (e.g., 112) in the chart that represents the 2D control space has coordinates of (0,0).

In some use scenarios (e.g., where sensors are unavailable or are not working properly), a user may desire to control the multimedia system with open loop control.

In the example shown in FIG. 1A, a user may select open loop control by selecting the "basic" button 117. For example, in an illustrative use scenario: (a) a user may select point 114 in the 2D chart and may then select "basic" button 117; and (b) these two actions together comprise an instruction to control the multimedia system with open loop control and to output a scene that has coordinates (in the 2D control space) that are at or close to the coordinates of selected point 114 in the 2D chart. Specifically, selecting point 114 in the 2D chart may cause the multimedia system to display the scene, in the system's stored scene library, that is closest to (in the 2D control space) to the selected point. For example, the scene may include a video projected on a projection screen, a sound track and room lighting. When in open loop mode, the user may change the selected target at any time by selecting new target coordinates and then selecting the "basic" button. For example, the user may change the selected target to point 111, which has coordinates (in the 2D control space) of (−0.25, 1.50).

Another example of open loop control, in illustrative implementations of this invention, is that a user may simply instruct the multimedia system to present a particular scene. In the example shown in FIG. 1A, a user may instruct the system to present a particular scene by: (a) selecting the "scene" button 122, which causes the GUI to display a list of scenes; and then (b) selecting the particular scene from the list of scenes.

In the example shown in FIG. 1A, a user may select closed loop control in the Goal mode by selecting the "goal" button 118. For instance, in an illustrative use scenario: (a) a user may select point 114 in the 2D chart and may then select "goal" button 118; and (b) these two actions together comprise an instruction to control the multimedia system with closed loop control in the Goal mode and to output a scene that has coordinates (in the 2D control space) that are at or close to the coordinates of selected point 114 in the 2D chart. Specifically, selecting point 114 in the 2D chart may cause the multimedia system to display the scene, in the system's stored scene library, that is closest to (in the 2D control space) to the selected point. In the Goal mode, however, sensors take measurements of the user. These measurements are provided as feedback. If Scene A is outputted because its assigned coordinates are closest to the coordinates of the user-selected target, but Scene A instead causes the user's state to change to coordinates other than Scene A's assigned coordinates, then the system may (based on feedback from the sensors), revise Scene A's coordinates and output a different scene which has coordinates that are closer to the user-selected point than are the revised coordinates of Scene A. In the Goal State mode, the GUI may display a point (e.g., 111) that represents the coordinates of the user's current state (in addition to displaying the user-selected target, e.g., point 114). All coordinates and distances in this paragraph are in a 2D control space.

A user who has selected Goal mode may want to skip a scene that has been automatically selected by the multimedia system. In the example shown in FIG. 1A, a user may achieve this by selecting the "skip" button 121. Selecting skip button 121 may cause the system to cease presenting the "skipped" scene and to transition to another scene that is automatically selected by the system.

In many use scenarios (including many scenarios with closed loop control in Goal mode or Maintain State mode), the multimedia system transitions from presenting a first scene to presenting a second scene only if the second scene is closer—by at least a threshold amount—to the target state than the first scene is. However, in some use scenarios, this threshold approach is not followed. For instance, in some cases, if a user selects a "skip" button and a new scene to skip to, then the system may—in order to allow the user to feel that she is in control—transition to the new scene even if coordinates of the new scene are closer, by less than the threshold amount, to the target than coordinates of the current scene are. Likewise, in some cases, if a user selects a "skip" button and a new scene to skip to, then the system may—in order to allow the user to feel that she is in control—transition to the new scene even if coordinates of the new scene are further from the target than coordinates of the current scene are. Furthermore, in some cases, if a user selects the "basic" button (for open loop control) and a target state, then the system may—in order to allow the user to feel that she is in control—transition to a new scene even if coordinates of the new scene are closer, by less than the threshold amount, to the target than coordinates of the current scene are. All coordinates and distances in this paragraph are coordinates and distances in the system's control space.

In the example shown in FIG. 1A, a user may select closed loop control in the Maintain State mode by selecting the "maintain" button 119. For instance, in an illustrative use scenario: (a) a user may select the "maintain" button 119 to control the multimedia system with closed loop control in the Maintain State mode. This comprises an instruction to the system to output a scene that has coordinates that are at or close to the coordinates of the user's current state. Specifically, selecting the "maintain" button 119 may comprise an instruction for the multimedia system to display the scene, in the system's stored scene library, that is closest to the user's state as of the time at which the "maintain" button is selected. In the Maintain State mode, sensors take measurements of the user. These measurements are provided as feedback. If Scene A is outputted because its assigned coordinates are closest to the coordinates of the user's state (as of the time that the "maintain" button is selected), but Scene A instead causes the user's state to change to coordinates other than Scene A's assigned coordinates, then the system may (based on feedback from the sensors), revise Scene A's coordinates and output a different scene which has coordinates that are closer to the user's state (as of the time that the "maintain" button is selected) than are the revised coordinates of Scene A. In the Maintain State mode, the GUI may display a point (e.g., 111) that represents the coordinates of the user's current state. All coordinates and distances in this paragraph are in a 2D control space.

Figure 1B:
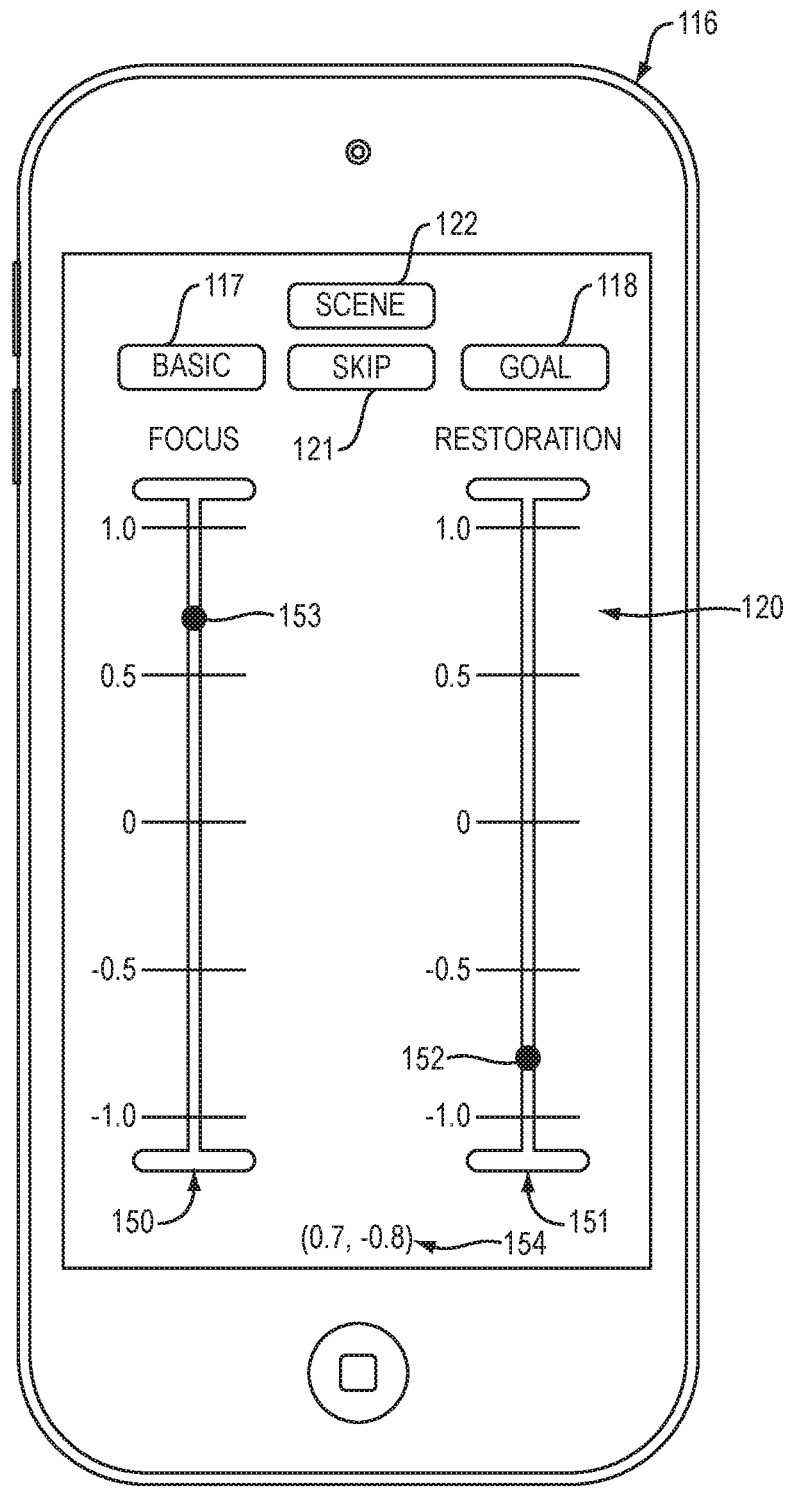
FIG. 1B shows another GUI for controlling a multimedia presentation.

FIG. 1B shows another GUI for controlling a multimedia presentation. In the example shown in FIG. 1B, an input/output (I/O) device 116 includes a screen 120 that displays a GUI. The GUI displays two axes 150, 151 that, taken together, represent a 2D control space with two control dimensions: Restoration and Focus. A user may select a point (e.g., 153) along the Focus axis 150 and may select a point (e.g., 152) along the Restoration axis 151. For example, the GUI may display the two axes 150, 151 as sliders, and a user may interface with the GUI in such a way that the user causes a slider displayed in the GUI to move to a desired point along each axis, respectively. A user may employ the GUI in FIG. 1B for open loop control, in the same way described above for FIG. 1A (except that the GUI in FIG. 1A displays the two control axes in a single 2D chart and the GUI in FIG. 1B displays the two control axes separately). Likewise, a user may employ the GUI in FIG. 1B for closed loop control in the Goal mode, in the same way described above for FIG. 1A (except that the GUI in FIG. 1A displays the two control axes in a single 2D chart and the GUI in FIG. 1B displays the two control axes separately).

The GUI may display the coordinates of a selected point or pair of points. For example, in FIG. 1A, when a user clicks on point 114, the GUI may cause bubble 115 to display the 2D coordinates of point 114. Likewise, in FIG. 1B, when a user selects a pair of points (e.g., 152, 153) on the Focus and Restoration axes, the GUI may display the coordinates of this pair of points (e.g., coordinates 154).

Mapping User State to Control Axes

In illustrative implementations, sensors take measurements regarding a user's state.

In illustrative implementations, the multimedia system maps sensor readings indicative of a user's state to a point in a low-dimensional control space. For example, the system may map sensor readings (indicative of a user's state) to a point in a 2D control space with two control dimensions (e.g., Restoration and Focus).

In some implementations, multiple types of sensors each take one or more different types of sensor readings, and thus the sensor space (of sensor readings) may have more dimensions than the two-dimensional control space.

FIG. 2A shows a two-dimensional description of a user's state (in terms of Focus and Restoration) which is calculated from sensor readings.

In the example shown in FIG. 2A, a high-dimensional sensor space 130 comprises samples taken by multiple (e.g., five or more) different sensors (e.g., 131, 132, 133). Each of these sensors may comprise a different kind of sensor. For example, the sensors may include a video camera, optical sensor, EDA (electrodermal activity) sensor, three-axis accelerometer, three-axis gyroscope, ECG (electrocardiography) sensor, EEG (electroencephalography) sensor, thermometer, and pulse oximeter. Their measurements may be processed to derive multiple different parameters, including heart pulse rate, RR interval, heart rate variability, heart waveform, respiration rate, respiration waveform, skin temperature, blood volume pulse, 3-axis acceleration, facial expression, EEG alpha theta band entropy, and EEG gamma beta band entropy. Each of these different parameters may comprise a dimension of the high dimension sensor space.

In FIG. 2A, the system processes the sensor readings to derive values in a 2D control space 110 that are indicative of the user's state. In FIG. 2A, the two axes of the control space are Restoration and Focus. In FIG. 2A, control space 110 has less dimensions than does sensor space 130.

In an illustrative use scenario shown in FIG. 2A: (a) the multimedia system processes sensor readings and determines that a user's state has the coordinates (in the 2D control space) of point 104, which coordinates are (−0.25, +0.25), that is −0.25 along the Focus axis and +0.25 along the Restoration axis; (b) then the user's state changes; and (c) then the system processes sensor readings and determines that the user's new state has the coordinates (in the 2D control space) of point 105, which coordinates are (0.75, −0.25), that is 0.75 along the Focus axis and −0.25 along the Restoration axis.

Figure 2B:
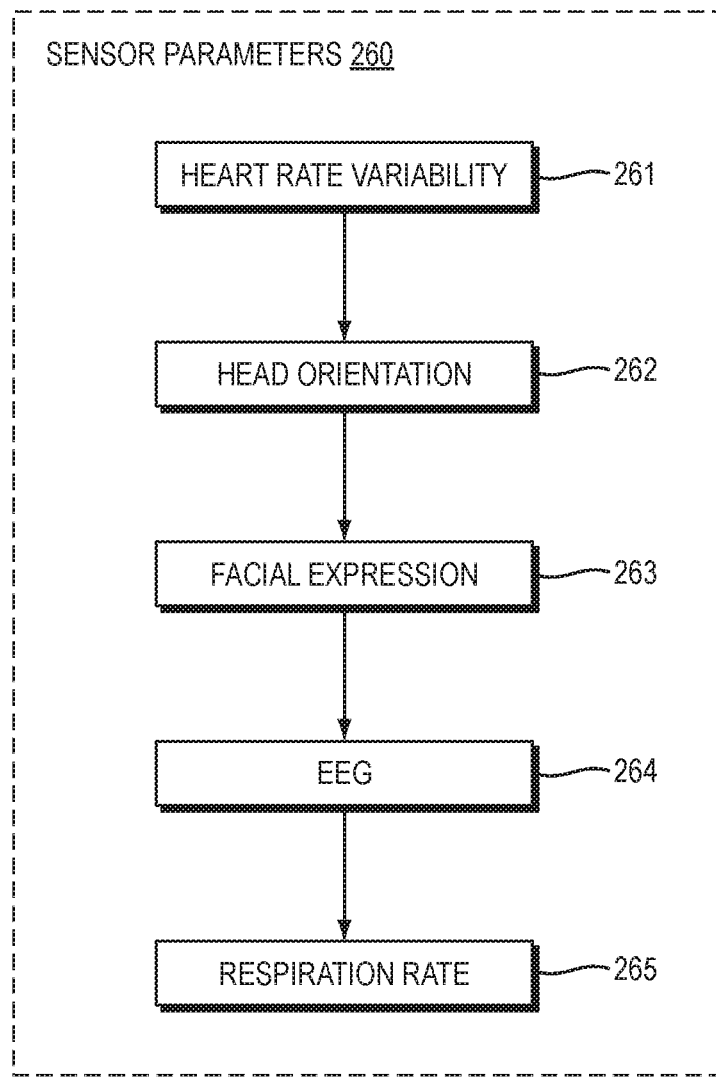
FIG. 2B shows examples of features that are calculated based on sensor readings.

In the example shown in FIG. 2B, a high dimensional set of parameters 260 are derived from sensor readings regarding a user. In FIG. 2B, features that are calculated based on sensor readings include heart rate variability 261, head orientation 262, facial expression 263, EEG state 264 (e.g., EEG alpha theta band entropy), and respiration rate 265.

Mapping Control Axes to Multimedia Output

In illustrative implementations, a low dimensional control space controls a higher dimensional set of multimedia outputs.

In some cases, a multimedia system includes many different transducers each with many different outputs, and the settings space (of multimedia settings that produce specific scenes) has more dimensions than the two-axis control system.

FIG. 3A shows a two-dimensional control space 320 that is employed to control outputs in a higher dimensional multimedia space 140. In FIG. 3A, the dimensions of the 2D control space 320 are Restoration and Focus.

In FIG. 3A, the multimedia output includes output by a set of multiple transducers (e.g., 141, 142, 143, 144). For example, these transducers may comprise one or more video projectors, display screens, speakers, and luminaires (such as ceiling or wall light fixtures or lamps).

In FIG. 3A, point 102 has coordinates of (−0.25, +0.5)—that is, −0.25 on the Focus axis and +0.5 on the Restoration axis. In FIG. 3A, point 101 has coordinates of (0,0) and point 103 has coordinates has coordinates of (0.7, −0.7). Thus, in FIG. 3A: (a) multimedia output that corresponds to point 103 is more conducive to focus than is multimedia output that corresponds to point 102; and (b) multimedia output that corresponds to point 102 is more conducive to Restoration (e.g., a casual, relaxed state) than is multimedia output that corresponds to point 103.

Different points in the 2D control space may be associated with different scenes, in a set of scenes stored in the system's scene library. For example, in FIG. 3A: (a) the multimedia system may be configured to output a large number of scenes, including scenes G and H; (b) points 102 and 103 may be associated with scenes G and H, respectively; (c) in open loop control, selecting point 102 in the 2D control space may comprise an instruction to display scene G; and (d) in open loop control, selecting point 103 in the 2D control space may comprise an instruction to display scene H.

In some cases, coordinates in the 2D control space are transformed into a virtual set of multimedia outputs 145, which are in turn transformed into instructions for the actual multimedia transducers (e.g., 141, 142, 143, 144). An advantage of the virtual set of multimedia outputs 145 is that it is not specific to any particular room. A computer may derive, from the virtual set of multimedia outputs 145, instructions for the actual multimedia transducers (e.g., 141, 142, 143, 144), based on a transform that maps from the virtual set of outputs to settings of multimedia transducers in a specific room.

Figure 3B:
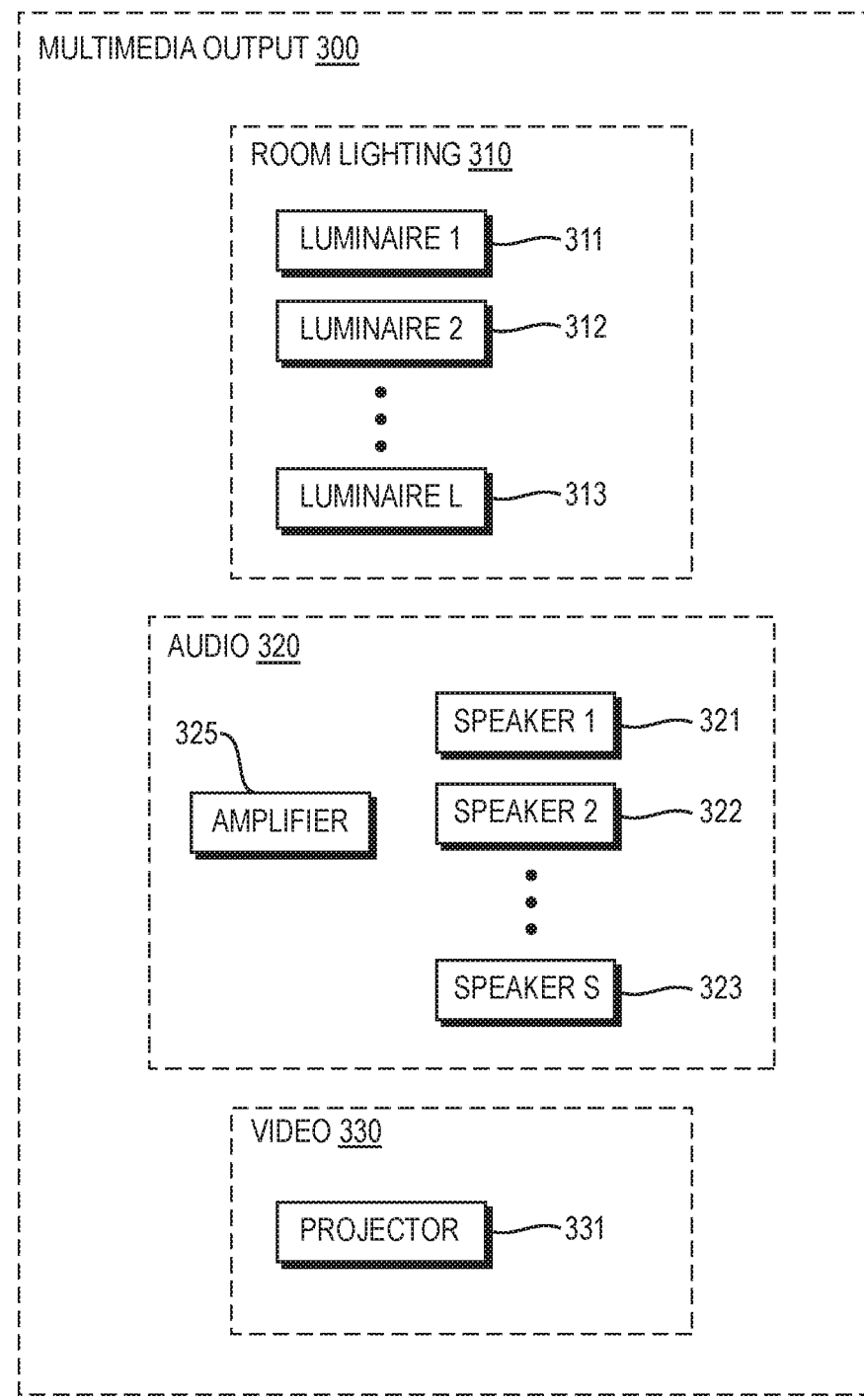
FIG. 3B shows a set of multimedia outputs.

FIG. 3B shows a high dimensional set of multimedia outputs 300. In the example shown in FIG. 3B, the multimedia outputs include room lighting 310, audio 320 and video 330. Room lighting 310 includes light provided by multiple luminaires (e.g. 311, 312, 313) such as ceiling and wall light fixtures and lamps. Audio output 320 may be produced by an amplifier 325 and a set of one or more speakers (e.g., 321, 322, 323). Video output may be produced by a projector 331 or an electronic display screen.

Hardware

Figure 4:
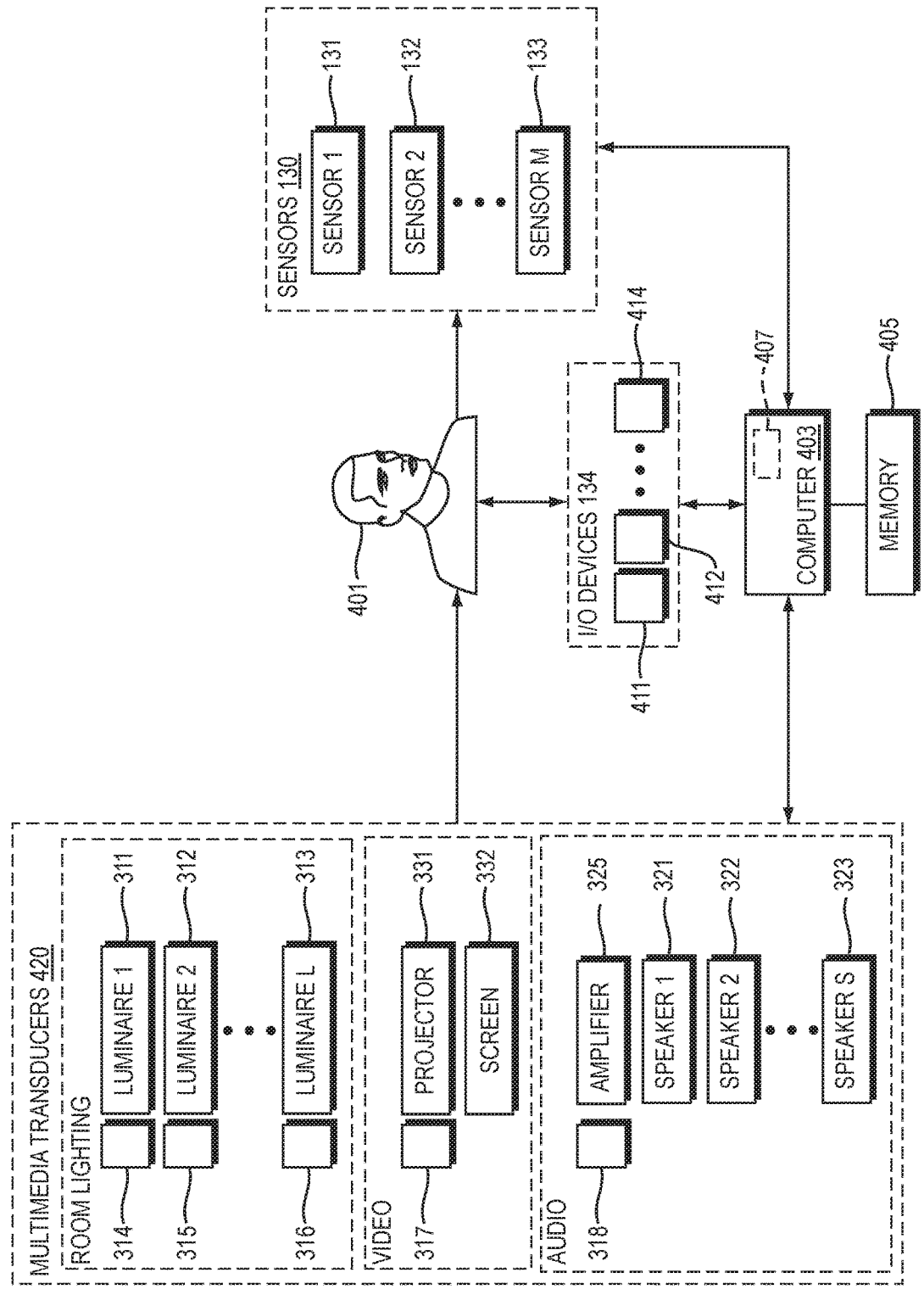
FIG. 4 illustrates hardware of a multimedia system.

FIG. 4 illustrates hardware of a multimedia system, in an illustrative implementation of this invention.

In FIG. 4, the multimedia system includes a set of sensors 130, including sensors 131, 132, 133 that take measurements of a user. For instance, sensors 130: (a) may take measurements regarding physiological parameters of the user, or regarding the user's activity level, type of activity, affect, facial expression, gaze direction, head orientation, or posture; (b) may recognize gestures of the user; (c) may detect the tone, content or other features of the user's verbal or written statements; or (d) may monitor actions taken by the user on computer. These sensor readings may be taken in real time. Sensors 130 may be located in any position suitable for taking measurements of the user. For example, one or more of sensors 130: (a) may be worn on, or attached to, or located in, any position of a user's body; or (b) may be located at a distance from a user (such as a webcam or other camera that captures video images of the user).

In addition, the system in FIG. 4 includes multimedia transducers 420, such as: (c) luminaires for room lighting (e.g., 311, 312, 313); (b) video display equipment, including a projector 331, screen 332; and (c) audio equipment, including an amplifier 325 and speakers 321, 322, 323. These multimedia transducers may output scenes, where each scene comprises a specific combination of room lighting, video and sound.

For example, projector 331 may comprise any type of video projector, including: (a) a LCD (liquid crystal display) projector with LCD light gates; (b) a DLP (digital light projector) or other projector that includes digital micromirror devices (DMDs); (c) an LCoS (liquid crystal on silicon) projector (e.g., that processes light in the Fourier domain); (d) a CRT (cathode ray tube) projector; (e) a projector that employs an array of LEDs (light emitting diodes) as a light source and that employs LCD, DLP, DMD or LCoS technology for image creation; (f) a laser diode projector, (g) a hybrid LED and laser diode projector; or (h) any other hybrid of any of the foregoing projector technologies.

In FIG. 4, screen 332 may comprise a projector screen upon which projector 331 projects images, including video images.

Alternatively, in FIG. 4: (a) screen 332 may comprise an electronic visual display screen; and (b) projector 331 may be omitted. For example, in some implementations of this invention, screen 332 comprises any type of electronic visual display screen, such as an LCD screen, a CRT screen, a plasma display panel, an LED screen, an OLED (organic LED) screen, an EL (electroluminescence) screen, a CRT screen, an FED (field emission display) screen, a VFD (vacuum fluorescent display) screen, an SED (surface-conduction electron-emitter display) screen, an active electronic display screen, or a passive electronic display screen. Or, for example, the electronic visual display screen may comprise a touch screen, such as: (a) a capacitive touch screen (including a touch screen that employs surface capacitance, projected capacitance, mutual capacitance or self-capacitance to detect touch); (b) a resistive touch screen; or (c) a touch screen that employs infrared acrylic projection, optical imaging, dispersive signal technology or acoustic pulse recognition.

In FIG. 4, a user 401 experiences a scene produced by the multimedia transducers 420. For example, the user 401 may: (a) listen to a sound track; (b) sometimes look up at a video; and (c) perform a task while the room is being illuminated by the room lighting. While the user experiences the scene, the sensors 130 may take measurements of the user's state.

In FIG. 4, a user 401 may interact with a set of input/output (I/O) devices 134, such as I/O devices 411, 412, 414. For example, the I/O devices may include one or more of: a touch screen, a display screen, a monitor screen, a microphone, earphones, speakers, a keyboard, and a computer mouse. The I/O devices may accept instructions that are inputted by a user, and may output information to a user.

In FIG. 4, one or more computers may control the multimedia system. For example, computer 403 may control and interface with sensors 330, and may process sensor readings to determine a user's state. Computer 403 may assign coordinates (in a control space) to a user's state. Likewise, computer 403 may assign coordinates (in a control space) to a scene. Computer 403 may (via microcontrollers) control and interface with multimedia transducers. For example, computer 403 may control microcontrollers 314, 315, 316, 317, 318, which may in turn control luminaire 311, luminaire 312, luminaire 313, projector 331 and amplifier 325, respectively. Also, for example, computer 403 may cause the multimedia transducers to output a scene that maps to specific point in a control space. Computer 403 may store data in, and read data from, a memory device 405. Computer 403 may communicate wirelessly with one or more other devices (either in or external to the multimedia system) via wireless module 407.

In FIG. 4, computer 403 may, depending on user instructions, cause the multimedia system to operate with open loop control or closed loop control. For example, in closed loop control, computer 403 may, in response to user instructions: (a) cause the system to operate in Goal mode; or (b) cause the system to operate in Maintain State mode.

Closed Loop Control

Figure 5:
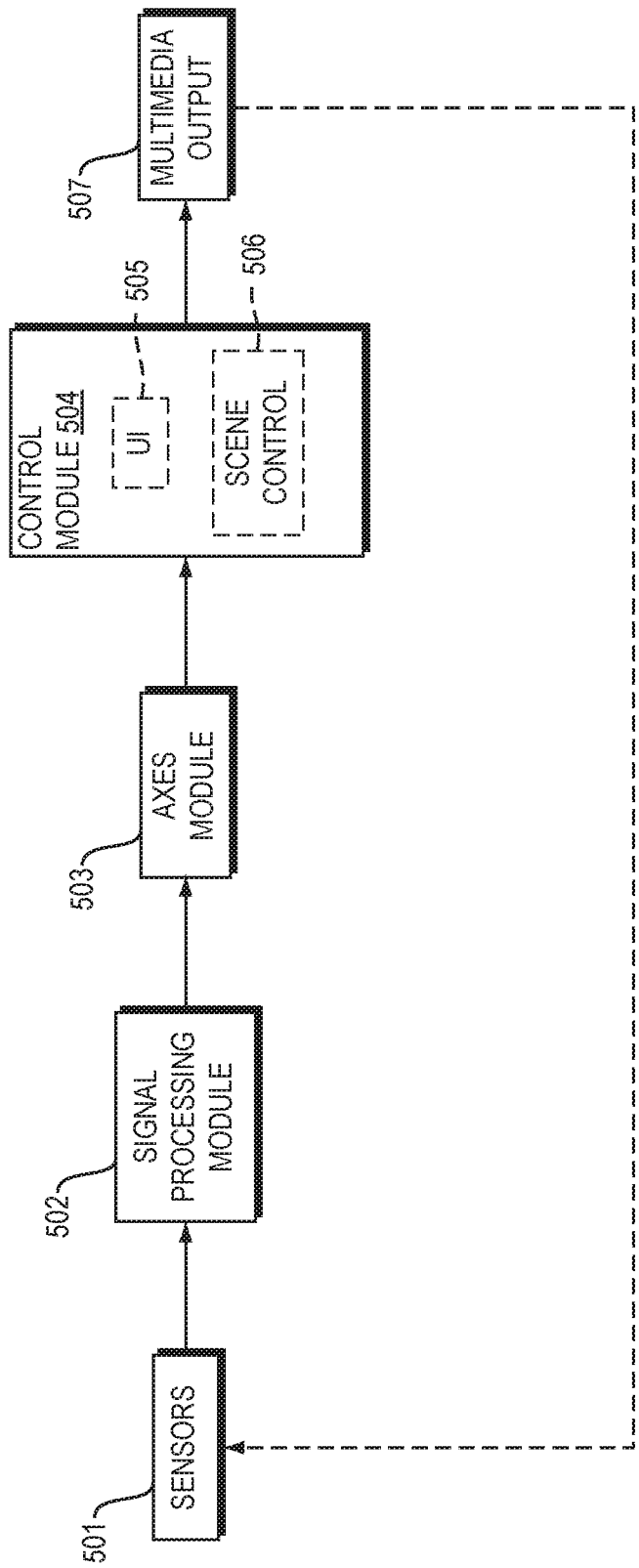
FIG. 5 shows closed-loop control of a multimedia system.

FIG. 5 shows closed-loop control of a multimedia system, in an illustrative implementation of this invention. In FIG. 5: (a) sensor readings are accepted by a computer as feedback, and (b) this feedback is used in control of the multimedia system.

In FIG. 5, sensors 501 take measurements of a user while the user is experiencing multimedia output 507 (e.g., video, sound and room lighting). In FIG. 5, one or more computers execute software programs that include a signal processing module 502, an axes module 503 and a control module 504. Signal processing module 502 processes sensor readings. Axes module 503 transforms the processed sensor readings into coordinates in a 2D control space (e.g., into a value on the Restoration control axis and into a value on the Focus control axis). Control module 504 includes: (a) user interface (UI) 505 for interacting with a user; and (b) a scene control module 506. The scene control module 506 outputs instructions that control the multimedia transducers and thus control output 507 of these transducers. Thus, in FIG. 5, scene control module 506 controls which scene is outputted.

Prototype

Next, we describe a prototype of this invention. This prototype is a non-limiting example of this invention.

In this prototype, either open loop control or closed loop control may be employed. In this prototype, closed loop control may be in Goal mode or in Maintain State mode.

Prototype—Control Axes

In this prototype, the control dimensions are Focus and Restoration.

Prototype—Room Layout/Multimedia Transducers

In this prototype, the multimedia system is located in a windowless rectangular room, 4.2 m by 2.8 m with a ceiling height of 2.6 m.

In this prototype, luminaires provide light with high dynamic range and controlled color temperature. In addition, a video display creates immersive illusions. In this prototype, the multimedia system synchronizes light and visual images with sound.

In this prototype, the multimedia system employs controllable lighting, projection, and sound, which are installed in a room and furniture. For lighting, this prototype employs individually controllable multi-channel fixtures. For sound, the prototype has two options, an ambisonic sound system using four speakers and alternatively a pair of wearable noise canceling headphones. The headphones offer control of ambient noise. A high-luminosity output projector with short throw lens projects a video onto a rear projection screen. The rear projection screen comprises a 1.83 m by 0.76 m light-diffusing acrylic.

Figure 6A:
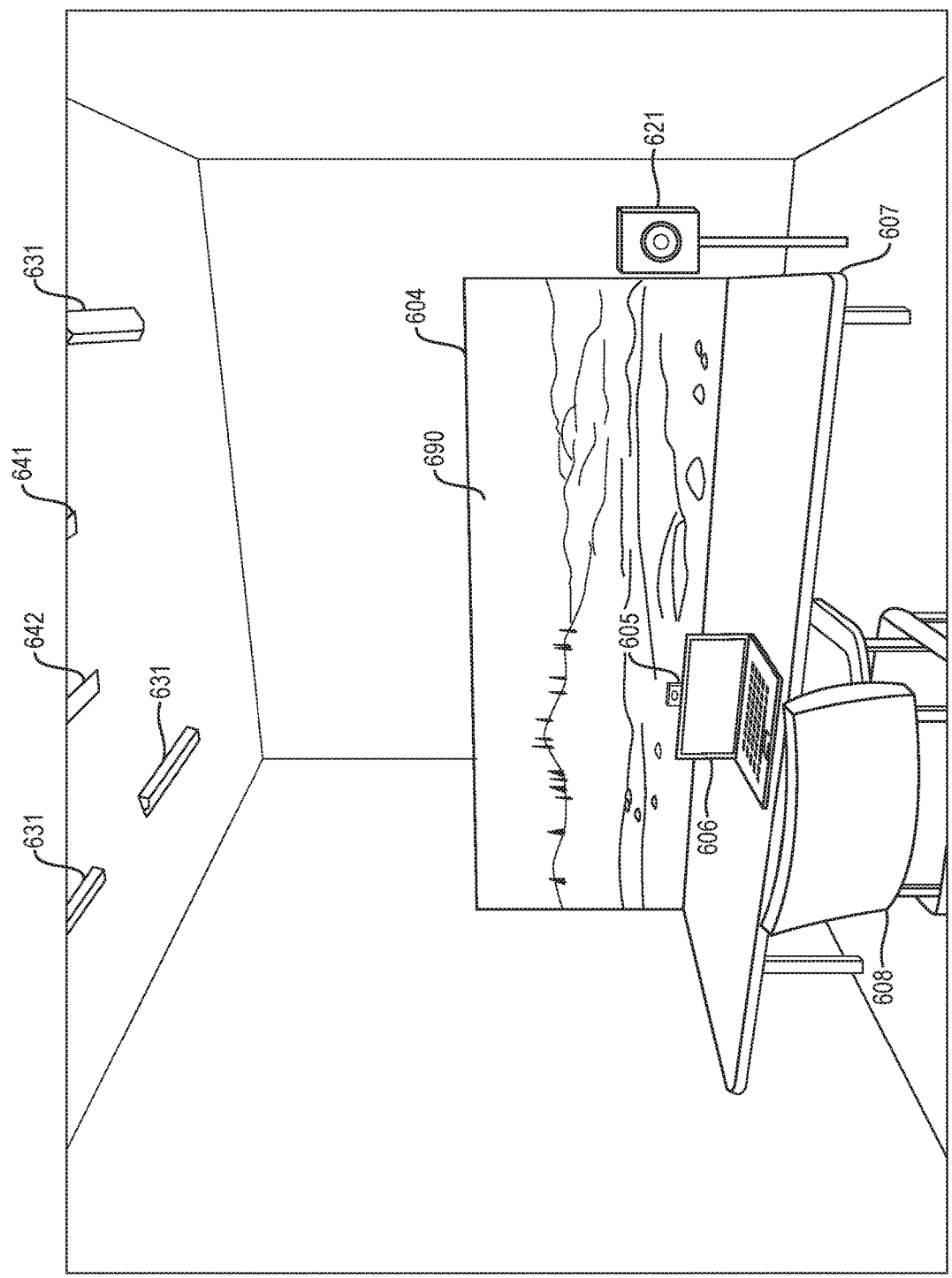
FIGS. 6A, 6B and 6C show an example of a multimedia system deployed in a room.
Figure 6B:
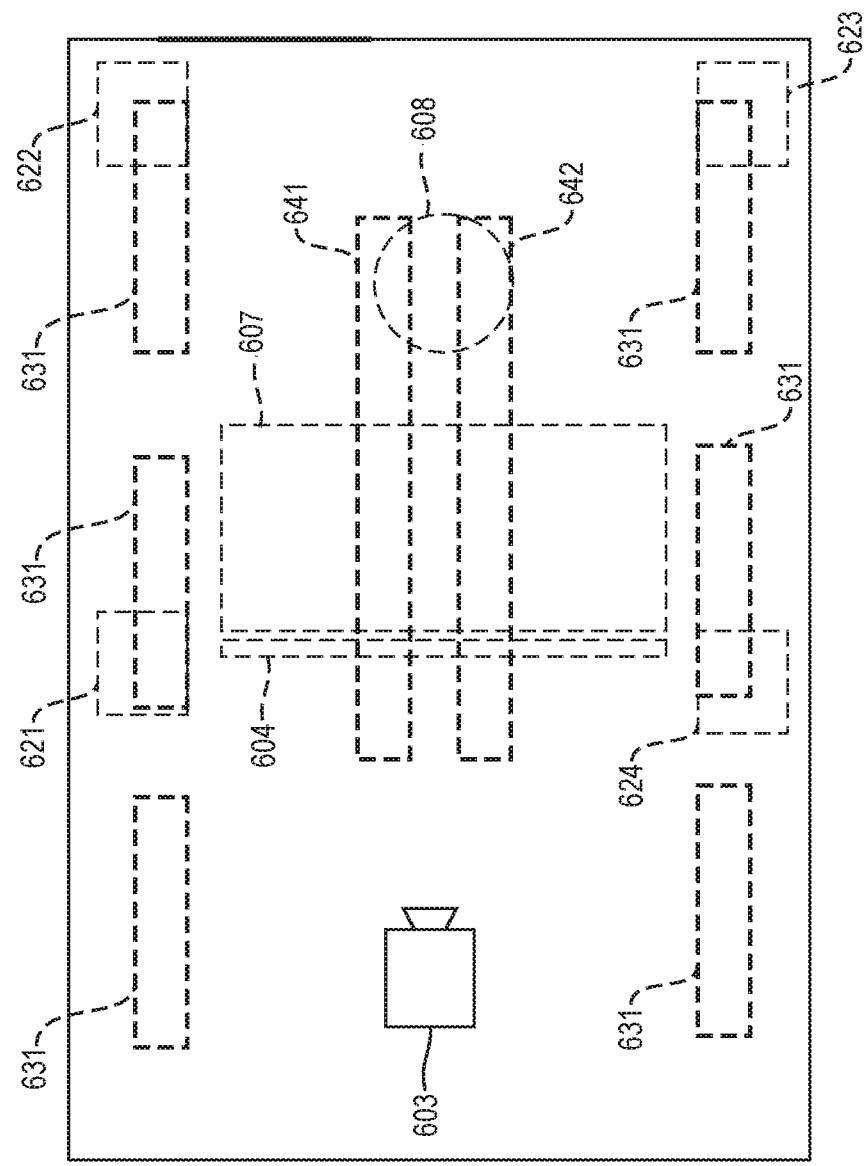
Figure 6C:
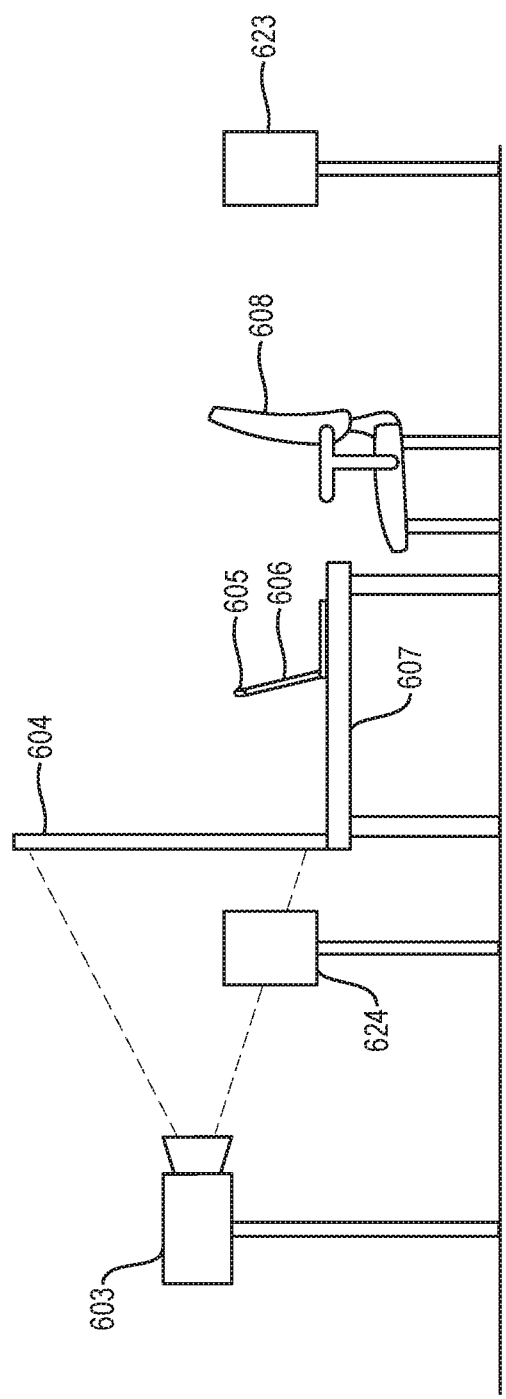

In this prototype, a multimedia system is deployed in a room, as shown in FIGS. 6A, 6B and 6C. FIGS. 6A, 6B and 6C are a perspective view, top view and side view, respectively, of the room. However, the positions of certain objects shown in FIG. 6A relative to the room are different than as shown in FIGS. 6B and 6C.

In this prototype (as shown in FIGS. 6A, 6B and 6C), the multimedia system includes ceiling luminaires (including wall-washing fixtures 631 and downlight fixtures 641, 642) that provide room lighting. In this prototype, the multimedia system also includes: (a) projector 603 and a rear projection screen 604 for displaying a video 690; and (b) speakers 621, 622, 623, 624 for outputting sound. In this prototype, the multimedia system also includes sensors that take measurements of a user (e.g., while a user is sitting in chair 608 and using laptop computer 606 that is located on desk 607). For example, wide-angle webcam video camera 605 captures images of a user while the user is sitting in chair 608.

Prototype—Multimedia Creation of Atmospheric Scenes

In this prototype, a scene library contains over 30 atmospheric environments based on real places. These include beaches, natural landscapes, indoor spaces such as libraries, cafes and museums, and scenes of metropolitan cities, train rides, and even a roller coaster ride. These scenes cover a wide range of effects and perspectives. They have different themes (nature, urban, indoor) and experiential attributes (motion, repetitiveness, color, brightness). Each scene contains video and sound data, a lighting configuration file and meta information of key characteristics.

In this prototype, the lighting configuration file is in JavaScript Object Notation (JSON) format, and contains position, size, intensity, and color information of virtual light sources.

In this prototype, virtual light sources, different than the actual physical installation in the space, may be positioned anywhere on the ceiling. The virtual ceiling is an x-y-plane. A room model of the physical setup converts the virtual light information to actual light settings. This separation of lighting configurations and the physical lighting layout is advantageous, because it makes the configuration file applicable for any space that may be described with a room model. Meta information, in JSON format, includes sound level, brightness level, light color temperature, light direction, keywords, dominant colors, descriptive name, ID, length, etc.

Figure 7:
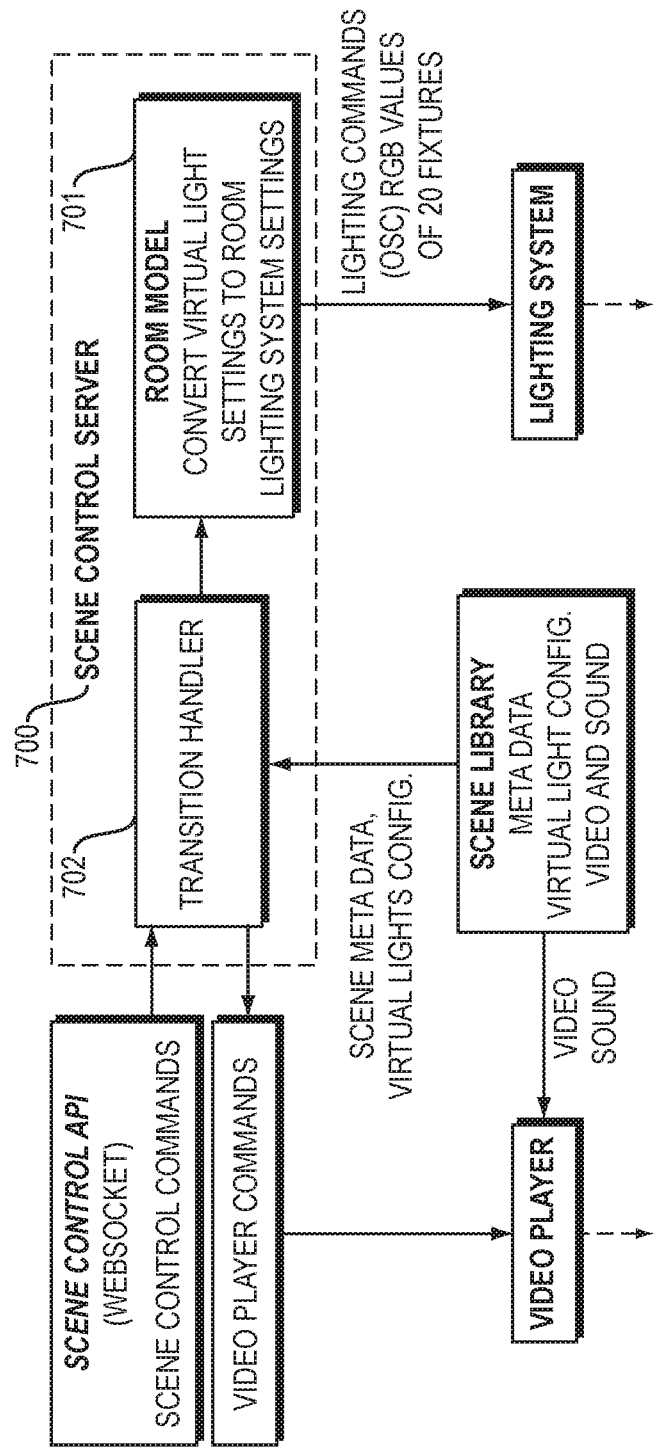
FIG. 7 shows a scene control server.

In this prototype, a computer executes software comprising a Scene Control Server. The Scene Control Server is implemented in Python™ and facilitates real-time control of output capabilities and manages transitions between atmospheric scenes. In this prototype, the Scene Control Server 700 includes a Room Model 701 and a Transition Handler 702, as shown in FIG. 7.

In this prototype, upon a scene transition request, the Transition Handler 702 loads the target scene from the Scene Library and initiates a fading effect with the specified transition speed. Subsequently, the Video Player software, which is responsible for video projection and sound, executes the desired transition. The transition typically means that video and sound of the current scene are gradually faded out and, after a short break in a neutral state, video and sound of the new scene are faded in. When the transition is completed, the Video Player sends a status update to the Scene Control Server. The Video Player is implemented in Javascript and displayed through a web browser. Video and sound are played in a loop. At the end of the video and sound file, typically an H.264 encoded.mp4 file, a cross-fade is initiated to a specified or random position in the video and soundtrack.

In this prototype, for lighting transitions, the Transition Handler 702 interfaces with the Room Model 701. The Room Model 701 is a transfer function from a virtual space to the actual lighting installation in the prototype office. The Room Model 701 contains information about the physical lighting installation in the room and maps the virtual light sources to the existing lighting system. The resulting RGB channel brightness settings are then sent to the lighting server, which controls the lighting systems in the prototype space.

In this prototype, a Scene Control API is a Websocket interface that facilitates Scene Control Commands and Video Player Commands.

In this prototype, a scene library includes a set of stored scenes, including the following five atmospheric scenes. The video lengths for these scenes vary. When a video reaches the end, it may dissolve to the beginning.

Forest Scene: In this prototype, during the Forest Scene, a video projection shows a forest in autumn. In this video: (a) a clear, shallow mountain stream flows though a dense, partially red-colored forest; (b) there is no camera motion; and (c) the perspective suggests that the viewer is resting, elevated over the stream. During the Forest Scene, a user hears the sound of the river and occasionally birds in the background. Low intensity, warm lighting completes this scene. Two virtual light sources in the center of the ceiling correspond to the forest opening and direction of lighting in the video.

Library Scene: In this prototype, during the Library Scene, a video shows a study room in a university library. In this video: (a) a number of students are present; (b) they are sitting at tables and studying independently; (c) there is no camera motion; (d) the viewer appears to be sitting at one of the tables in the library. During the Library Scene, a user hears the ambient sound of the space, such as movements, or when someone enters or leaves. High intensity, white light characterizes the ambiance of the room. A virtual light source in the center of the ceiling corresponds to the fluorescent ceiling lights in the image.

Kites Scene: In this prototype, during the Kites Scene, a video shows three kites against the background of a blue sky. In this video: (a) the horizon is not visible; (b) each kite has a unique shape, flying speed and trajectory; (c) the third kite appears and disappears from the screen depending on its movement; (d) there is no camera motion, but compared to the Library and Forest scenes, there is significantly more visual action; and (e) the camera perspective suggests that the viewer is resting and looking up to the sky. During the Kites scene, a user hears ocean waves crashing in the background. During the Kites scene, cold, high intensity, primarily indirect, lighting complements the color and openness of the sky.

City Scene: In this prototype, during the City Scene, a video shows a walk though the Shibuya district in Tokyo, Japan. In this video: (a) the camera moves steadily at walking speed through crowds of pedestrians; (b) the video captures activities of a busy walking district with colorful billboards, shops, and buildings from a first-person-perspective. During the City Scene, a user hears (among other things) the sound from the street, some illegible speech, music coming from the stores, etc. During the City Scene, a mix of direct and indirect, high-intensity white light provides room lighting, which corresponds with the weather in the video image.

Neutral Scene. In this prototype, during the Neutral Scene, room lighting is uniform, white and at medium intensity. However, in the Neutral Scene, the multimedia system does not display any video and does not output any sound.

Prototype—User Perception of Scenes

In this prototype, user surveys are conducted to determine how users perceive scenes that are generated by the multimedia system. In these surveys, users provide ratings for different scenes.

In this prototype, two measures are employed to determine users' perception of the scenes. These two measures are Perceived Focus Potential and Perceived Restoration Potential. Users rate the scenes, and the ratings are collected. In this prototype, all ratings use a five-point Likert scale ranging from −2 ("very low") to 2 ("very high"). Perceived Focus Potential describes the scene's suitability for demanding work tasks that require mental concentration, as perceived by the user. Likewise, Perceived Restoration Potential describes how suitable a scene is for restoring from a stressful situation. Users rate each atmospheric scene on seven variables.

In this prototype, two questions in the survey ask users to rate the suitability of the rendered scene for specific work scenarios. The first question invites the user to imagine herself in a situation where she is full of energy and about to start a challenging task. This rating measured the Perceived Focus Potential. The second question asks the user to imagine herself in a position where she needs to recover from the prolonged mental effort. This rating contributed to the Perceived Restoration Potential.

In this prototype, for an additional five questions, users rate the atmospheric scene on five facets of a restorative environment, Compatibility, Coherence, Being-away, Fascination, and Scope. In this prototype, the Perceived Restoration Potential is the mean of all restoration-related ratings.

In this prototype, user perceptions differ significantly among the atmospheric scenes for both Perceived Focus Potential and Perceived Restoration Potential (PRP).

In this prototype, Forest and Kites atmospheres are usually perceived as both restorative and conducive to focused activities. On average, the City scene is perceived as promoting restoration but not focus. Library and Neutral scenes are usually perceived as less restorative, but suitable for focus. In this prototype: (a) there is a substantial variance among users' ratings; and (b) response correlates with personal preference. For instance, in this prototype, personal appreciation for an environment has a significant influence on restoration outcome. Nature scenes are usually more restorative than urban landscapes. Atmospheric scenes, such as the Forest or Kites scenes, are usually perceived as more restorative than the Neutral office. In this prototype, users tend to rate the Forest and Kites scenes as more restorative than the City scene, and the City scene as more restorative than the Neutral office.

In this prototype, high variance in the perceptual ratings suggests strong personal bias. A user's preference of ambiance depends on both the context and the individual. For example, the City scene is restorative for some users, but causes the opposite reaction for others.

Prototype—Sensors

In this prototype, sensors are used to evaluate users' response to atmospheric changes. They are also used for real-time activity recognition and context-aware dynamic control. Sensor Collection Server software manages and stores incoming sensor data streams. Using the Sensor Collection Server, sensors may be easily added or removed from the system.

In this prototype, wearable sensors are employed for monitoring. The sensors include a heart rate and monitor chest strap (Zephyr™ Bioharness 3), a wrist worn monitoring device (Empatica® E4, and EEG headband (InteraXon Muse™ headband).

In this prototype, facial feature tracking is performed using the Intraface software library (CMU Human Sensing Laboratory and University of Pittsburgh Affect Analysis Group, Intraface) in combination with a wide-angle USB camera (Logitech, Genius, WideCam F100). In this prototype, the wide-angle USB camera is placed in front of the user, on top of the user's computer screen. It captures the user's face and part of the upper body. A wide-angle camera is desirable to capture the user's facial expression even when the user's face moves.

In this prototype, the Zephyr™ Bioharness 3 sensor takes the following measurements at the following sampling rates: Heart Rate (1 Hz), RR Interval (18 Hz), ECG (250 Hz), Respiration Rate (1 Hz), Breathing Waveform (25 Hz), Posture (1 Hz), Activity Level (1 Hz), Peak Acceleration (1 Hz), and 3 Axis Acceleration (100 Hz).

In this prototype, the Empatica® E4 sensor takes the following measurements at the following sampling rates: 3 Axis Acceleration (32 Hz), Blood Volume Pulse (64 Hz), Inter Beat Interval, Electrodermal Activity (4 Hz), Skin Temperature (4 Hz).

In this prototype, the facial tracking system (including video camera and Intraface software): (a) takes measurements of 49 facial feature points, 3D head orientation, and 3D viewing orientation; and (b) identifies six emotions (neutral, angry, disgust, happy, sad and surprised). The facial tracking system records and processes videos at approximately 10 fps with a resolution of 1280 by 720 pixels.

In this prototype, the Muse™ headset takes measurements of EEG alpha theta band entropy and EEG gamma beta band entropy.

In this prototype, the Sensor Collection Server software manages incoming data streams and data logging to storage. This module is implemented in Python™ software using the Twisted library—an asynchronous, event-driven networking engine. This network engine builds on the reactor pattern, in which a reactor loop multiplexes incoming requests to the appropriate request handler. Request handlers are implemented for each sensor with the service to parse, format and log incoming data for example as .csv files.

Prototype—Measures

In this prototype, the following sensor measurements are employed as indicators of focus or restoration.

In this prototype, heart rate variability (HRV) is calculated as follows: A Zephyr™ Bioharness 3 sensor records RR, which measures the time interval between consecutive heart beats. This signal is generated using the ECG (electrocardiography) waveform sampled at 1000 Hz. For the calculation of HRV, the recorded RR interval series is as converted to an equidistantly sampled series by cubic spline interpolation. The resulting sample rate is 18 Hz. A standard deviation of RR intervals (SDNN) method is employed to compute HRV. SDNN is calculated for consecutive overlapping sections of 1 min of the resampled RR data, then a moving average filter with a window length of 10 s is applied. The result is set to the right edge of the window.

In tests using this prototype, mean HRV in restorative conditions was 1.5 times higher than in non-restorative scenes. HRV was also on average 20% more likely to be above personal mean and 36% more likely to be more than one standard deviation higher in restorative conditions. There were no significant differences of HRV between focus and non-focus conditions.

In this prototype, head orientation information is employed to estimate where users directed their visual attention. A lifted head position is associated with attention towards the projection screen, which is tall and further away. Accordingly, looking at the table or laptop computer results in a dropped head orientation. A restorative environment naturally draws attention, whereas a focus environment tends not to create distraction. Head orientation is estimated by the Intraface software.

In this prototype, head orientation is processed in two ways. The first variation, which we refer to as Viewing Scene, only uses head pitch angle above average. The Viewing Scene measure only considers lifted head positions and is used for the Restoration indicator. The second Head Orientation measure, which we refer to as Viewing Desk, includes the full range of possible head pitch angles. Users' head pitch angle faces more downwards in focus than non-focus environments, which results in significant mean differences. Thus, the Viewing Desk measure is used for the Focus indicator.

In this prototype, facial expression indicates whether the user exhibits emotional changes. The Neutral feature, which is computed by the Intraface software library, is employed. The Neutral feature is reported as a confidence level between 0 and 1, with a value of 1 indicating a confident detection of Neutral expression. It is not normalized per person in post processing. Neutral facial expression is significantly more often detected in focus than non-focus environments.

In this prototype, low respiration rates are indicators of a relaxed and restorative state of user. Thus, respiration rate is an input to the Restoration indicator.

In this prototype, EEG spectral analysis is employed. The EEG spectral analysis may divide the signal into five frequency bands that are associated with different mental states. Alpha waves may be observed in healthy individuals when they are awake but are in a relaxed, resting mental state or when their eyes are closed. An increase of Theta activity, on the other hand, has been associated with a state of drowsiness in adults. Beta and Gamma waves are of higher frequency and occur during focused mental activity.

In this prototype, an entropy-based approach is employed to compute Focus and Relaxation scores from relative EEG spectral band powers. For the Relaxation score, Tsallis entropy is computed using the relative spectral power of the Alpha and Theta bands. For the Focus score, EEG Gamma-Beta, Gamma and Beta bands are used. The Tsallis entropy $H_{T_s}$ is a non-logarithmic parameterized entropy measure defined as $$H_{T_s} = \frac{1}{\alpha - 1} \cdot \sum_i (p_i - p_i^\alpha)$$

Prototype—Signal Processing

In this prototype, a Processing API provides real-time access to sensor data from the Sensor Collection Server software. A subscriber to this service opens a TCP socket to connect. Upon connection, it receives sensor updates at a specified update rate. Data packages typically contain a data type, timestamp and value vector in JSON format. Example data packages with dummy data are:

```
"type": respiration,
"timestamp": 1493746492.0000,
    "value": [10]
    "type": rr,
"timestamp": 1493746493.0000,
    "value": [1,2,3 . . . ]
```

In this prototype, the Signal Processing Server software computes real-time state indicators from raw sensor values. State indicators are high level features that describe the user's state. They are aligned with the contextual control dimensions as defined by the control map. In this prototype, there are two indicators, the Focus indicator and Restoration indicator. This service is implemented in Python™ and subscribes to the Processing API.

In this prototype, aggregated mean is sufficient to detect changes if the range of activity is limited. For example, where the user remains sitting and performs certain tasks that require mental attention but little movement, the aggregated mean sensor readings may accurately compute the focus and restoration indicators. However, the prototype software is set up to easily replace the mean values method with a quantiles or histogram type representation, which take into account the probability distribution.

In this prototype, in a first step, all incoming sensor data are added to an associated User Model. Each human user has several User Models, one for each sensor feature, such as RR, Respiration Rate, and Neutral Facial Expression. In this prototype, a P-squared algorithm is employed to construct the models. The P-squared algorithm is a heuristic method that dynamically calculates median and quantiles without storing the data. An advantage of the P-squared algorithm is that it requires minimal, fixed data storage. The User Models are loaded when the Signal Processing Server is started.

In this prototype, using these personal models, Z-scores are calculated for the incoming sensor data with $x_{p,f} = (X - \mu_{p,f})/\sigma_{p,f}$, where x is the sensor data point, p is the user's ID, and f is the sensor feature. Accordingly, $\mu_{p,f}$ and $\sigma_{p,f}$ are the mean value and standard deviation extracted from the User Model of user p and sensor feature f. The Z-score values are then low pass filtered and combined to a weighted sum to compute the state indicators. If a feature is temporarily not available, then its weight is distributed to the other features.

Figure 8:
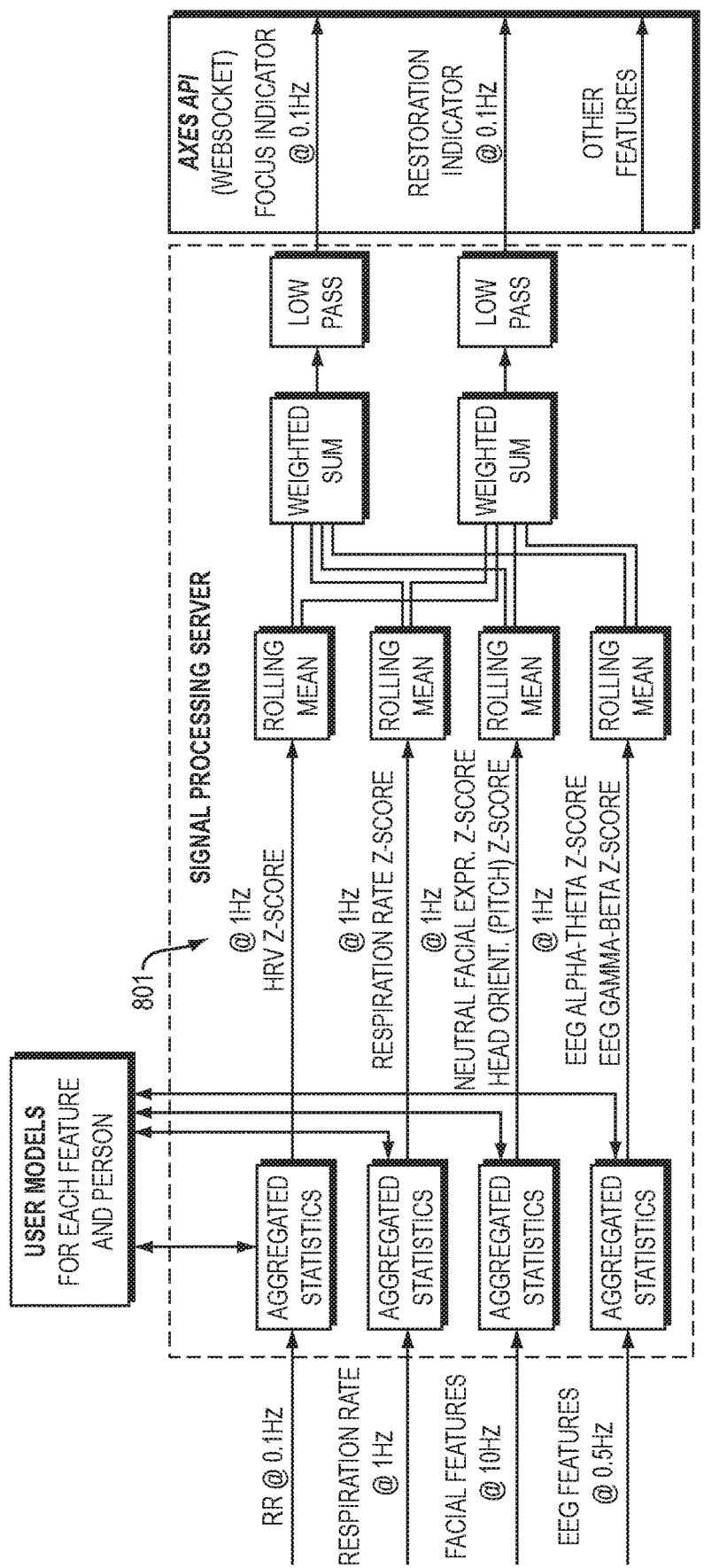
FIG. 8 shows a signal processing server.

FIG. 8 shows a signal processing server, in this prototype. In the example shown in FIG. 8, Z-scores 801 are processed to calculated state indicators.

FIG. 9A shows features 901 that are derived from sensor readings and that are employed to determine a restoration indicator 902, in this prototype.

FIG. 9B shows features 911 that are derived from sensor readings and that are employed to determine a focus indicator 912, in this prototype.

Prototype—Closed Loop Control, Generally

In this prototype, an Axes API integrates sensing and output capabilities. A subscriber to this API receives regular updates of the Focus and Restoration indicators and measures (features) formatted in JSON. The encoding of features is: 0—Focus Indicator, 1—Restoration Indicator, 2—Heart Rate Variability, 3—Viewing Scene, 4—Respiration Rate, 5—Neutral Facial Expression, 6—Viewing Computer, 7—EEG Gamma-Beta, 8—EEG Alpha-Theta. A feature is null when it is currently not available.

In this prototype, a control application determines how the system or the atmospheric conditions adapt to the user's changes.

In this prototype, a web-based graphical user interface enables user interaction with the control application. Before the application starts, the user selects her profile. Upon login, the system loads the appropriate Scene Models from the scene library, which contains information about the user's settings and response to each scene.

In this prototype, there is, for each user, one Focus Model and one Restoration Model for each available scene.

In this prototype, for each given scene and user, the Focus Model contains information about the scene's suitability for focus activities and determines its position in the control map along the focus axis. It accumulates observations related to the user's level of focus and produces statistical measures, e.g. the observed mean level of focus, using the P-squared algorithm. The mean value defines the scene's position on the control map.

In this prototype, the Focus Model accumulates observations related to the user's level of focus and produces statistical measures, e.g. the observed mean level of focus, using the P-squared algorithm. The mean value defines the scene's position on the control map.

In this prototype, manual preference input initiates the Focus model. While viewing the scene, the user specifies its suitability for focus by dragging it into the desired position on the control map. This input generates a dummy dataset with k datapoints using a narrow uniform distribution, where the mean is the selected level of focus. The dummy data is then added to an empty model using the P-squared algorithm. The resulting model simulates an ideal case, where the observations are entirely in agreement with the user's prediction or preference. If no additional sensor observations are available, the manual selection determines the position of the scene in the control map. When observations are added, the model slowly shifts towards the actual response. The speed of adaptation depends on the size of the dummy dataset k. In this application, k is designed to reduce the influence of the initial selection by half after 15 minutes.

Likewise, in this prototype, for each given scene and user, the Restoration Model contains information about the scene's suitability for restoration activities and determines its position in the control map along the restoration axis. The Restoration Model operates in the same manner as the Focus Model, except that models focus instead of restoration.

In this prototype, a graphical user interface displays a control map as a two-dimensional graph. In this prototype, the GUI displays the atmospheric scenes and the current state or operating point derived from real-time sensor data. A bar-graph next to the control map displays the features in real-time. Finally, the GUI allows the user to start or stop the application and select scenes manually. In this prototype, the GU is implemented using Javascript® software and the application itself using Python™ software.

Prototype—Two Modes of Closed Loop Control

In this prototype, there are two modes of closed loop control: (1) Maintain State mode and (2) Goal mode. In the Maintain State mode, the multimedia system may select a scene to help the user remain in the same user state as when she selected the mode. In the Goal mode the user may specify a goal and the system may select the atmospheric scene that is most likely to guide the user towards the target state.

In this prototype, in the Maintain State mode, an update loop searches for the scene that is the closest to the current state or operating point in the control map. It calculates the distance to the operating point to all available scenes using the Scene Models. If the closest scene is not the current scene on display, then it tests whether the new scene is by a margin closer to the operating point than the current scene (e.g., step 1008 in FIG. 10). This constant margin introduces a hysteresis or inertia to prevent instabilities caused by frequent changes. If this margin is achieved, then a request for the new scene is sent to the Scene Control Server.

FIG. 10 illustrates a Maintain State mode of closed loop control, in this prototype.

In this prototype, in the Goal mode, a user may select a goal (target) by dragging the goal marker in the focus/restoration control map. The marker may be readjusted at any time. The system then selects the scene that is closest to the goal on the control map (e.g., step 1108 in FIG. 11). During usage, more data is accumulated about the user's response to the selected scene, and the Scene Model updates according to the incoming data. As a result, the position of the scene on the control map relocates. If the scene is contributing to the goal, then the distance between the scene and goal will be decreased. Conversely, if the scene is not contributing to user's goal, the distance between the scene and the goal will increase. Eventually, if the distance becomes large enough, another scene will be selected for the user. This mode also offers a Skip button. This button allows the user to change to another scene that is also beneficial for their goal.

Figure 11:
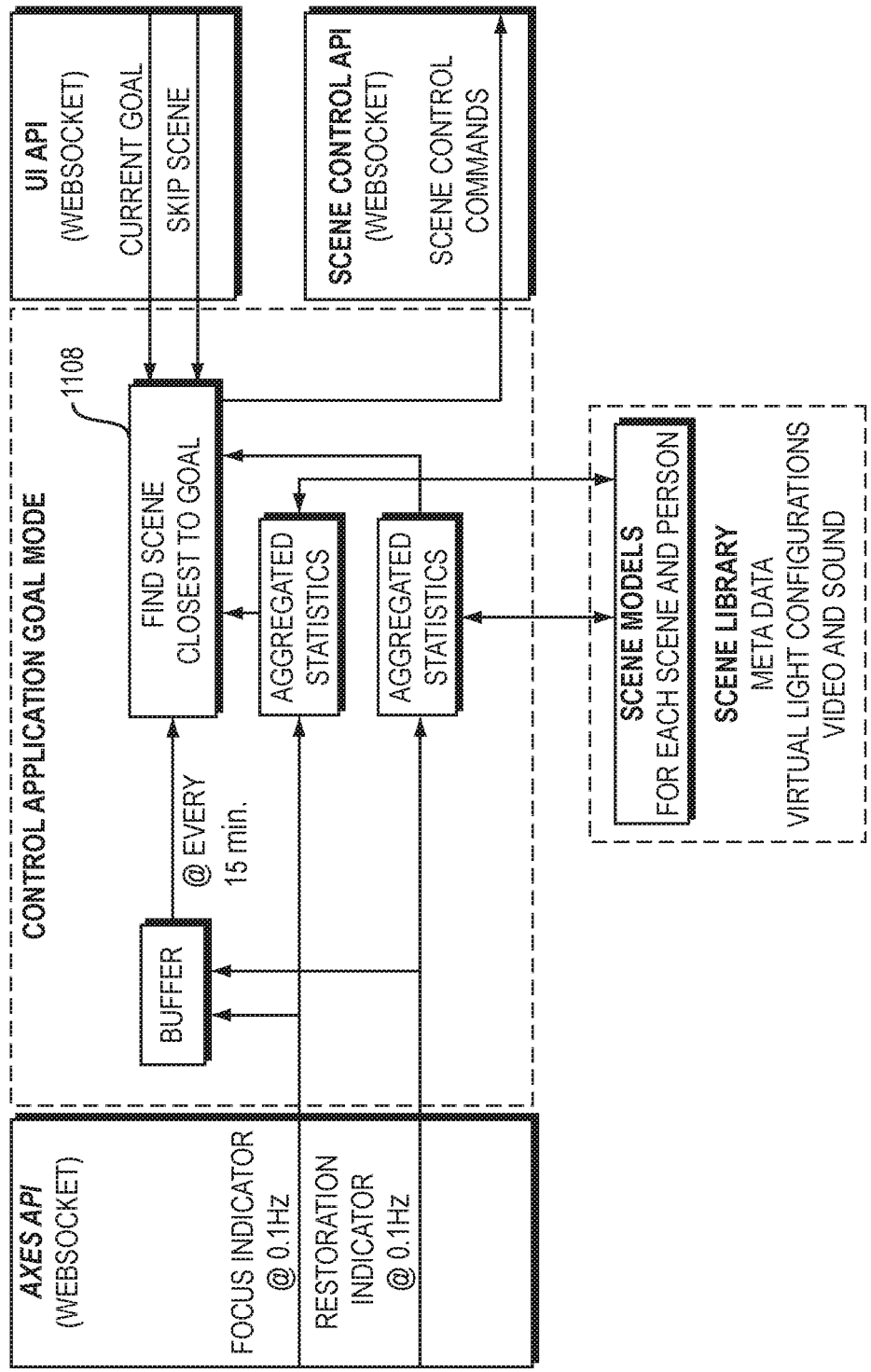
FIG. 11 illustrates a Goal mode of closed loop control.

FIG. 11 illustrates a Goal mode of closed loop control, in this prototype.

The prototype described in the preceding 67 paragraphs (not counting titles of sections as paragraphs) is a non-limiting example of this invention. This invention may be implemented in many other ways.

Dimensionality Reduction to Create Control Axes

In some implementations, the control axes are—or have been previously—derived, via a dimensionality reduction algorithm, from a higher-dimensional perceptual space. The higher-dimensional perceptual space may comprise data regarding different scenes or regarding users' perceptions of different scenes. These scenes may be multimedia presentations that comprise video, audio and room lighting and that were outputted by a multimedia system in a room.

For example, in some cases, the dimensionality-reduction algorithm comprises PCA (principal component analysis). In some cases, a computer performs a PCA algorithm to convert data in a high dimensional space (e.g., comprising a dataset of user ratings of scenes) into a set of principal components, in such a way that: (a) the first principal component has the largest possible variance (accounts for as much variability in data as possible); and (b) each succeeding principal component has the highest possible variance under the constraint that it is orthogonal to the preceding components. For instance: (a) the PCA algorithm may be performed with a PSYCH package in the R software environment, employing the Varimax rotation method; (b) the first two rotated principal components outputted by the PCA algorithm may comprise restoration and focus; and (c) restoration and focus may be selected as the dimensions (or axes) of a 2D control space for a multimedia system.

This invention is not limited to PCA. Any dimensionality reduction algorithm method may be employed to initially determine control axes. Or the control axes may be heuristically determined, without a formal algorithm.

Figure 12:
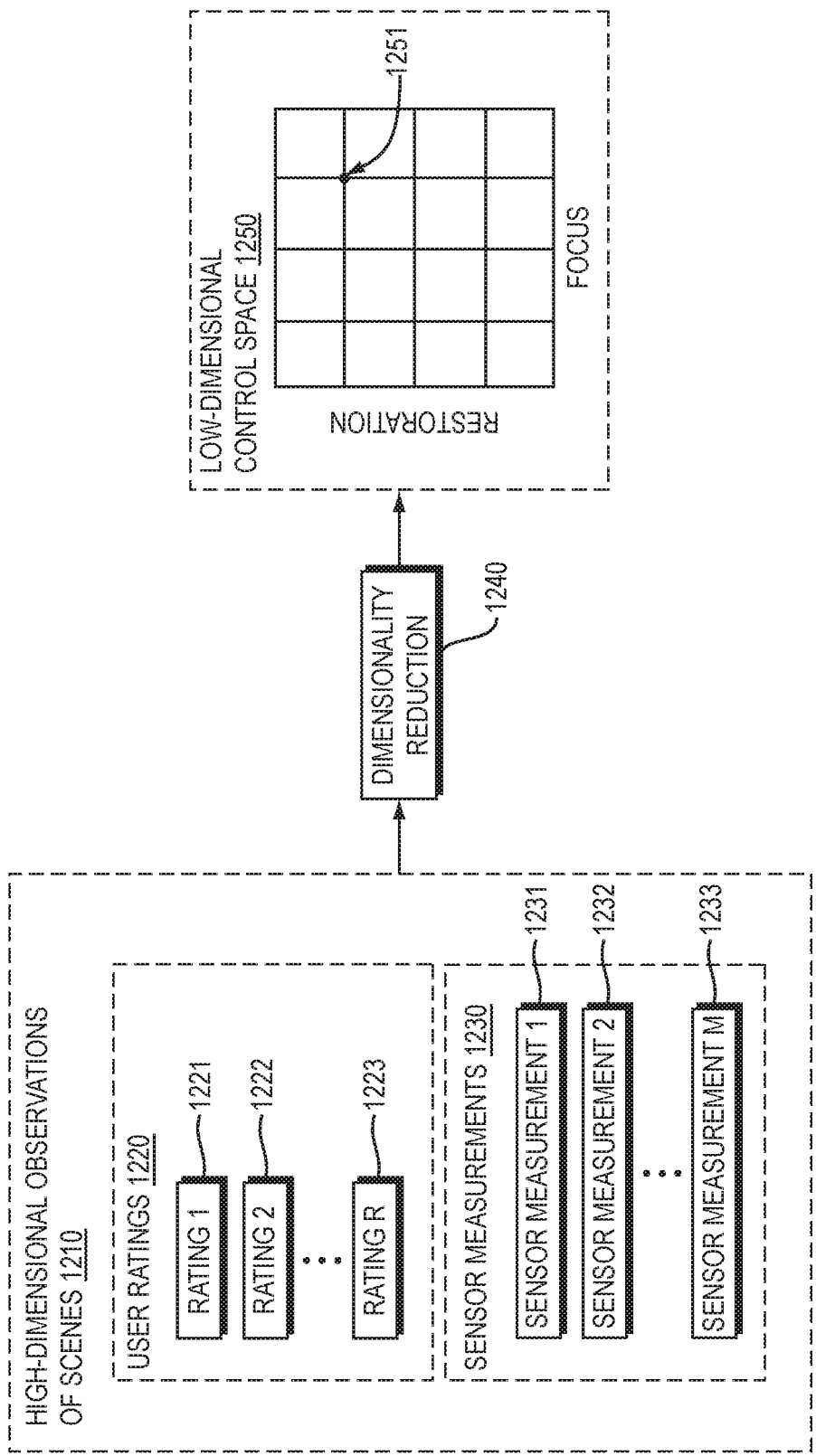
FIG. 12 shows a 2D control space that is derived from higher dimensional observations of scenes.

FIG. 12 shows a 2D control space 1250 that is—or has been—derived from higher dimensional observations of scenes 1210.

In FIG. 12, observations of multiple different scenes are taken (e.g., observations of multiple different scenes that are presented by a multimedia system in a single room at different times). The observations may comprise user ratings 1220 of multiple scenes, including ratings 1221, 1222, 1223. The user ratings may be provided by a group of users who observe the different scenes and fill out answers in a survey to rate the scenes. Optionally, the observations may also include sensor measurements 1230 of the multiple different scenes, including sensor measurements 1231, 1232, 1233.

In FIG. 12, a computer may perform a dimensionality reduction algorithm 1240 to derive a low-dimensional control space. For example, the dimensionality reduction algorithm may comprise principal component analysis.

In FIG. 12, two axes of a control space are derived from the high dimensional set of observations of scenes. In FIG. 12, these two axes are Restoration and Focus. In FIG. 12, the coordinates of a point (e.g., 1251) in the 2D control space are values on a Restoration axis and Focus axis, respectively.

Technical Improvement

Conventional multimedia systems do not employ closed loop control with both: (a) a control space that includes at least two contextual control dimensions; and (b) feedback from sensors. As a result, a conventional multimedia system suffers from one or both of the following problems: (1) it does not allow a user to control a scene in accordance with two or more control axes that correspond directly to the user's goals or intentions; and (2) it does not adjust its output based on sensor feedback.

This invention is a technical improvement over conventional multimedia systems. Among other things, in illustrative implementations of this invention, a multimedia system: (1) may allow a user to control a scene in accordance with two or more control axes that correspond directly to the user's goals or intentions; and (2) may adjust its output based on sensor feedback. This provides a much better user experience. Among other things, in illustrative implementations of this invention: (a) the control space is more intuitive for the user; (b) the control space allows the user to control multiple control axes simultaneously; and (c) sensor feedback allows the system to customize its output for an individual user.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of a multimedia system, including any luminaire, projector, electronic display screen, touch screen, audio amplifier, speaker, microphone, keyboard, mouse, or other input/output device or transducer; (2) to accept sensor measurements as feedback; (3) to determine a user state, based on sensor measurements, and to associate a user state with coordinates in a control space; (4) to associate settings of the multimedia system (or scenes outputted by the multimedia system) with coordinates in a control space; (5) to accept input specifying a target user state, which target is either a user's current state or a different state, and to cause the multimedia system to adjust its output (e.g., scene presented) to achieve the target; (6) to revise, based on sensor feedback, coordinates in a control space that are assigned to a scene; (7) to perform open loop control or to perform closed loop control; (8) to receive data from, control, or interface with one or more sensors; (9) to perform any other calculation, computation, program, algorithm, or computer function described or implied herein; (10) to receive signals indicative of human input; (11) to output signals for controlling transducers for outputting information in human perceivable format; (12) to process data, to perform computations, and to execute any algorithm or software; and (13) to control the read or write of data to and from memory devices (items 1-13 of this sentence referred to herein as the "Computer Tasks"). The one or more computers (e.g., 314, 315, 316, 317, 318, 403) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, electronic devices (e.g., 131, 132, 133, 314, 315, 316, 317, 318, 403, 411, 412, 414) are configured for wireless or wired communication with other devices in a network.

For example, in some cases, one or more of these electronic devices each include a wireless module for wireless communication with other devices in a network. Each wireless module (e.g., 407) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 314, 315, 316, 317, 318, 403) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

I/O Devices

In illustrative implementations, a multimedia system includes, or interfaces with, I/O devices. For example, in some cases, the I/O devices comprise one or more of the following: touch screens, cameras, microphones, speakers, accelerometers, gyroscopes, magnetometers, inertial measurement units, pressure sensors, touch sensors, capacitive sensors, buttons, dials, sliders, transducers (e.g., haptic transducers), graphical user interfaces, electronic display screens, and projectors.

In illustrative implementations, a human inputs data or instructions via one or more I/O devices. The multimedia system may output data or instructions via one or more I/O devices.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

A non-limiting example of "accepting input from" X is accepting input indirectly from X. A non-limiting example of a computer "accepting input from" a user is the computer accepting input from the user via one or more I/O devices that are external to the computer.

Non-limiting examples of "associating" X with Y include: (a) accessing a database that associates X with Y; and (b) accessing a lookup table that associates X with Y.

"At least implicitly" means implicitly or explicitly.

To compute "based on" specified data means to perform a computation that takes the specified data as an input.

Non-limiting examples of a "camera" include: (a) a digital camera; (b) a digital grayscale camera; (c) a digital color camera; (d) a video camera; (e) a light sensor or image sensor, (f) a set or array of light sensors or image sensors; (g) an imaging system; (h) a light field camera or plenoptic camera; (i) a time-of-flight camera; and (j) a depth camera. A camera includes any computers or circuits that process data captured by the camera.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

A "contextual control axis" means an axis wherein a coordinate on the axis is indicative of a degree to which a scene facilitates or is perceived to facilitate a user state or of a degree to which the user state occurs.

A "contextual control space" means a control space that has contextual control axes.

A "control axis" means a dimension of a control space.

A "control space" means a space, in the mathematical sense.

Distance between "coordinates" of X and "coordinates" of Y means the distance between the point specified by the coordinates of X and the point specified by the coordinates of Y.

"Defined Term" means a term or phrase that is set forth in quotation marks in this Definitions section.

To say that X "depends" on Y means that X varies as a function of one or more variables that include Y.

For an event to occur "during" a time period, it is not necessary that the event occur throughout the entire time period. For example, an event that occurs during only a portion of a given time period occurs "during" the given time period.

The term "e.g." means for example.

"Electronic display screen" means an electronic visual display screen.

The fact that an "example" or multiple examples of something are given does not imply that they are the only instances of that thing. An example (or a group of examples) is merely a non-exhaustive and non-limiting illustration.

A non-limiting example of a scene "facilitating" a specific user state is the scene helping a user to attain the specific user state. Another non-limiting example of a scene "facilitating" a specific user state is the scene causing or inducing (or tending to cause or induce) the specific user state.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

The noun "focus" means a state in which attention is focused. As used herein, there may be degrees of focus, depending on the extent to which attention is focused.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"I/O device" means an input/output device. Non-limiting examples of an I/O device include a touch screen, other electronic display screen, keyboard, mouse, microphone, handheld electronic game controller, digital stylus, display screen, speaker, or projector for projecting a visual display.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

"Media console" means (a) one or more luminaires; (b) one or more projectors; (c) one or more electronic display screens; (d) one or more speakers; or (e) any combination of the items described in one or more of clauses (a), (b), (c) and (d).

The term "or" is inclusive, not exclusive. For example, A or B is true if A is true, or B is true, or both A or B are true. Also, for example, a calculation of A or B means a calculation of A, or a calculation of B, or a calculation of A and B.

To "output a scene" means to present a scene that includes video, sound and illumination, the illumination being different than the video.

"Observations" of a scene means data regarding human perceptions of the scene or regarding measurements of the scene by one or more sensors.

To "present a scene to a user" means to present a scene that includes video, sound and illumination, in such a way that: (a) the video is visible to the user, the sound is audible to the user, and the illumination illuminates an environment visible to the user; and (b) the illumination is different than the video.

A parenthesis is simply to make text easier to read, by indicating a grouping of words. A parenthesis does not mean that the parenthetical material is optional or may be ignored.

A "scene" means a combination of one or more of the following: (a) a video, (b) an audio presentation and (c) illumination (other than the video) from an artificial light source.

A non-limiting example of a "stored scene" is data that: (a) represents the content of the scene; and (b) is stored in a memory device.

As used herein, "sensor" does not include a human.

As used herein, the term "set" does not include a group with no elements.

Unless the context clearly indicates otherwise, "some" means one or more.

As used herein, "speaker" does not include a human.

A non-limiting example of "specifying" coordinates is explicitly or implicitly specifying the coordinates. Another non-limiting example of "specifying" coordinates is explicitly or implicitly specifying information from which the coordinates are extractable. To say that input "specifies" that coordinates of X are coordinates of Y means that the input implicitly or explicitly assigns the coordinates of Y to the coordinates of X. As a non-limiting example, if coordinates of Y are (1,1) and input "specifies" that the coordinates of X are the coordinates of Y, then the input causes the coordinates of X to be (1,1).

As used herein, a "subset" of a set consists of less than all of the elements of the set.

The term "such as" means for example.

"Threshold amount" means a constant, finite, non-zero number. Unless the context clearly indicates otherwise, to say a "first" threshold amount and a "second" threshold amount (without explicitly saying whether the first and second threshold amounts are equal or otherwise explicitly stating facts that establish whether the first and second threshold amounts are equal) does not create any implication regarding whether the first and second amounts are equal.

To say that a machine-readable medium is "transitory" means that the medium is a transitory signal, such as an electromagnetic wave.

A "user state" means a state of a user.

The phrase "user state of the user when the input is accepted" means the user state of the user as of the time when the input is accepted. In this phrase, the last five words of the phrase (i.e., "when the input is accepted") modify the first four words of the phrase (i.e., "user state of the user").

A video display system means a system comprising (a) a projector or (b) an electronic display screen.

Except to the extent that the context clearly requires otherwise, if steps in a method are described herein, then the method includes variations in which: (1) steps in the method occur in any order or sequence, including any order or sequence different than that described herein; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a a system comprising: (a) a media console; (b) one or more sensors; and (c) one or more computers; wherein the system is configured (i) to accept input from a user, which input specifies coordinates of a target state, which coordinates specify a point in a contextual control space, which control space has at least two contextual control axes, (ii) to associate each scene in a set of scenes, respectively, with coordinates in the contextual control space, (iii) to select a specific scene, in the set of scenes, which has coordinates, in the contextual control space, that are closer, by at least a first threshold amount, to the coordinates of the target state than are the coordinates of any other scene in the set of scenes, including any scene then being presented by the system, (iv) to present the specific scene to the user, (v) to calculate, based on measurements taken by the sensors, coordinates, in the contextual control space, of a specific user state of the user that results from presenting the specific scene to the user, (vi) to revise the coordinates of the specific scene, based on the coordinates of the specific user state that results from presenting the specific scene, (vii) after revising the coordinates of the specific scene, to select a second scene, in the set of scenes, that is different than the specific scene and that has coordinates in the contextual control space which are then closer, by at least a second threshold amount, to the coordinates of the target state than are the coordinates of any other scene in the set of scenes, including the first scene; and (viii) to present the second scene to the user. In some cases, the input specifies that the coordinates of the target state are the coordinates, in the contextual control space, of a current user state, which current user state is a user state of the user when the input is accepted. In some cases, the system is configured to accept coordinates of the target state that are different than coordinates, in the contextual control space, of a user state of the user when the input is accepted. In some cases, the at least two contextual control axes consist of only two contextual control axes. In some cases: (a) the at least two contextual control axes include a focus axis and a restoration axis; (b) a coordinate on the focus axis is indicative of a degree to which a scene facilitates or is perceived to facilitate focus or of a degree to which focus occurs; and (c) a coordinate on the restoration axis is indicative of a degree to which a scene facilitates or is perceived to facilitate relaxation or of a degree to which relaxation occurs. Each of the cases described above in this paragraph is an example of the system described in the first sentence of this paragraph, and is also an example of an embodiment of this invention that may be combined with other embodiments of this invention.

In some implementations, this invention is a system comprising: (a) a media console; (b) one or more sensors; and (c) one or more computers; wherein the system is configured: (i) to accept input from a user, which input specifies coordinates of a target state, which coordinates specify a point in a control space, which control space has at least two control axes, (ii) to associate each scene in a set of scenes, respectively, with coordinates in the control space, (iii) to select a specific scene, in the set of scenes, which has coordinates, in the control space, that are closer, by at least a first threshold amount, to the coordinates of the target state than are the coordinates of any other scene in the set of scenes, including any scene then being presented by the system, and (iv) to present the specific scene to the user. In some cases: (a) the control space is a contextual control space; and (b) the control axes are contextual control axes.

In some cases, the system is configured: (a) to calculate, based on measurements taken by the sensors, coordinates, in the control space, of a specific user state of the user that results from presenting the specific scene to the user; (b) to revise the coordinates of the specific scene, based on the coordinates of the specific user state that results from presenting the specific scene; (c) after revising the coordinates of the specific scene, to select a second scene, in the set of scenes, that is different than the specific scene and that has coordinates in the control space which are then closer, by at least a second threshold amount, to the coordinates of the target state than are the coordinates of any other scene in the set of scenes, including the first scene; and (d) to present the second scene to the user. In some cases, the input specifies that the coordinates of the target state are the coordinates, in the control space, of a current user state, which current user state is a user state of the user when the input is accepted. In some cases, the system is configured to accept coordinates of the target state that are different than coordinates, in the control space, of a user state of the user when the input is accepted. In some cases: (a) the at least two control axes consist of only a focus axis and a restoration axis; (b) a coordinate on the focus axis is indicative of a degree to which a scene facilitates or is perceived to facilitate focus or of a degree to which focus occurs; and (c) a coordinate on the restoration axis is indicative of a degree to which a scene facilitates or is perceived to facilitate relaxation or of a degree to which relaxation occurs. In some cases: (a) the at least two control axes include a creativity axis; and (b) a coordinate on the creativity axis is indicative of a degree to which a scene facilitates or is perceived to facilitate creativity or of a degree to which a user attains a creative state. In some cases, the system is configured to modify a scene in such a way that coordinates, in the control space, of the scene move closer to the coordinates, in the control space, of the target state. In some cases, the one or more computers are programmed to employ multiple user models for the user, one model at a time, in such a way that the coordinates of the specific scene depend on which of the user models is employed. In some cases, the one or more computers are programmed to employ multiple user models for the user, one model at a time, in such a way that the coordinates of the user state depend on which of the user models is employed. Each of the cases described above in this paragraph is an example of the system described in the first sentence of this paragraph, and is also an example of an embodiment of this invention that may be combined with other embodiments of this invention.

In some implementations, this invention is a method comprising: (a) accepting input from a user, which input specifies coordinates of a target state, which coordinates specify a point in a contextual control space, which control space has at least two contextual control axes; (b) associating each scene in a set of scenes, respectively, with coordinates in the contextual control space; (c) selecting a specific scene, in the set of scenes, which has coordinates, in the contextual control space, that are closer, by at least a first threshold amount, to the coordinates of the target state than are the coordinates of any other scene in the set of scenes, including any scene then being presented by the system, (d) presenting the specific scene to the user; (e) taking, with sensors, measurements of the user; (f) calculating, based on the measurements, coordinates, in the contextual control space, of a specific user state of the user that results from presenting the specific scene to the user; (g) revising the coordinates of the specific scene, based on the coordinates of the specific user state that results from presenting the specific scene; (h) after revising the coordinates of the specific scene, selecting a second scene, in the set of scenes, that is different than the specific scene and that has coordinates in the contextual control space which are then closer, by at least a second threshold amount, to the coordinates of the target state than are the coordinates of any other scene in the set of scenes, including the first scene; and (i) presenting the second scene to the user. In some cases, the input specifies that the coordinates of the target state are the coordinates, in the contextual control space, of a current user state, which current user state is a user state of the user when the input is accepted. In some cases, the coordinates of the target state are different than coordinates, in the contextual control space, of a user state of the user when the input is accepted. In some cases, the at least two contextual control axes consist of only two contextual control axes. In some cases: (a) the at least two contextual control axes include a focus axis and a restoration axis; (b) a coordinate on the focus axis is indicative of a degree to which a scene facilitates or is perceived to facilitate focus or of a degree to which focus occurs; and (c) a coordinate on the restoration axis is indicative of a degree to which a scene facilitates or is perceived to facilitate relaxation or of a degree to which relaxation occurs. Each of the cases described above in this paragraph is an example of the method described in the first sentence of this paragraph, and is also an example of an embodiment of this invention that may be combined with other embodiments of this invention.

Each description herein (or in any of the Provisionals) of any method or apparatus of this invention describes a non-limiting example of this invention. This invention is not limited to those examples, and may be implemented in other ways.

Each description herein (or in any of the Provisionals) of any prototype of this invention describes a non-limiting example of this invention. This invention is not limited to those examples, and may be implemented in other ways.

Each description herein (or in any of the Provisionals) of any implementation, embodiment or case of this invention (or any use scenario for this invention) describes a non-limiting example of this invention. This invention is not limited to those examples, and may be implemented in other ways.

Each Figure herein (or in any of the Provisionals) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the implementations (including hardware, hardware components, methods, processes, steps, software, algorithms, features, or technology) that are described or incorporated by reference herein.

What is claimed:
1. A system comprising:
(a) a media console;
(b) one or more sensors; and
(c) one or more computers;

wherein the system is configured
  (i) to associate each scene in a set of stored scenes with coordinates in a contextual control space, which control space has at least two contextual control axes,
  (ii) to accept input from a user, which input specifies coordinates of a target state, which coordinates specify a point in the contextual control space,
  (iii) to select a specific scene, in the set of stored scenes, which has coordinates, in the contextual control space, that are closer, by at least a first threshold amount, to the coordinates of the target state than are the coordinates of any other scene in the set of stored scenes, including any scene then being presented by the system,
  (iv) to present the specific scene to the user,
  (v) to calculate, based on measurements taken by the sensors, coordinates, in the contextual control space, of a specific user state of the user that results from presenting the specific scene to the user,
  (vi) to revise the coordinates of the specific scene, based on the coordinates of the specific user state that results from presenting the specific scene,
  (vii) after revising the coordinates of the specific scene, to select a second scene, in the set of stored scenes, that is different than the specific scene and that has coordinates in the contextual control space which are then closer, by at least a second threshold amount, to the coordinates of the target state than are the coordinates of any other scene in the set of stored scenes, including the specific scene; and
  (viii) to present the second scene to the user.

2. The system of claim 1, wherein the input specifies that the coordinates of the target state are the coordinates, in the contextual control space, of a current user state, which current user state is a user state of the user when the input is accepted.

3. The system of claim 1, wherein the system is configured to accept coordinates of the target state that are different than coordinates, in the contextual control space, of a user state of the user when the input is accepted.

4. The system of claim 1, wherein the specific scene and the second scene, when presented to the user, each comprise:
  (a) a video;
  (b) an audio presentation; and
  (c) artificial illumination other than the video.

5. The system of claim 1, wherein:
  (a) the at least two contextual control axes include a focus axis and a restoration axis;
  (b) a coordinate on the focus axis is indicative of a degree to which a scene facilitates or is perceived to facilitate focus or of a degree to which focus occurs; and
  (c) a coordinate on the restoration axis is indicative of a degree to which a scene facilitates or is perceived to facilitate relaxation or of a degree to which relaxation occurs.

6. A system comprising:
  (a) a media console;
  (b) one or more sensors; and
  (c) one or more computers;
  wherein the system is configured:
  (i) to associate each scene in a set of stored scenes with coordinates in a contextual control space, which control space has at least two contextual control axes,
  (ii) to accept input from a user, which input specifies coordinates of a target state, which coordinates specify a point in the contextual control space,
  (iii) to select a specific scene, in the set of stored scenes, which has coordinates, in the control space, that are closer, by at least a threshold amount, to the coordinates of the target state than are the coordinates of any other scene in the set of stored scenes, including any scene then being presented by the system, and
  (iv) to present the specific scene to the user.

7. The system of claim 6, wherein:
  (a) the control space is a contextual control space; and
  (b) the control axes are contextual control axes.

8. The system of claim 6, wherein the specific scene, when presented to the user, comprises:
  (a) a video;
  (b) an audio presentation; and
  (c) artificial illumination other than the video.

9. The system of claim 6, wherein the input specifies that the coordinates of the target state are the coordinates, in the control space, of a current user state, which current user state is a user state of the user when the input is accepted.

10. The system of claim 6, wherein the system is configured to accept coordinates of the target state that are different than coordinates, in the control space, of a user state of the user when the input is accepted.

11. The system of claim 6, wherein:
  (a) the at least two control axes consist of only a focus axis and a restoration axis;
  (b) a coordinate on the focus axis is indicative of a degree to which a scene facilitates or is perceived to facilitate focus or of a degree to which focus occurs; and
  (c) a coordinate on the restoration axis is indicative of a degree to which a scene facilitates or is perceived to facilitate relaxation or of a degree to which relaxation occurs.

12. The system of claim 6, wherein:
  (a) the at least two control axes include a creativity axis; and
  (b) a coordinate on the creativity axis is indicative of a degree to which a scene facilitates or is perceived to facilitate creativity or of a degree to which a user attains a creative state.

13. The system of claim 6, wherein the system is configured to modify the specific scene in such a way that coordinates, in the control space, of the specific scene move closer to the coordinates, in the control space, of the target state.

14. The system of claim 6, wherein the one or more computers are programmed to employ multiple user models for the user, one model at a time, in such a way that the coordinates of the specific scene depend on which of the user models is employed.

15. The system of claim 8, wherein the one or more computers are programmed to employ multiple user models for the user, one model at a time, in such a way that the coordinates of the specific user state depend on which of the user models is employed.

16. A method comprising:
  (a) associating each scene in a set of stored scenes with coordinates in a contextual control space, which control space has at least two contextual control axes,
  (b) accepting input from a user, which input specifies coordinates of a target state, which coordinates specify a point in the contextual control space,
  (c) selecting a specific scene, in the set of stored scenes, which has coordinates, in the contextual control space, that are closer, by at least a first threshold amount, to the coordinates of the target state than are the coordinates of any other scene in the set of stored scenes, including any scene then being presented by the system, (d) presenting the specific scene to the user;

(e) taking, with sensors, measurements of the user;

(f) calculating, based on the measurements, coordinates, in the contextual control space, of a specific user state of the user that results from presenting the specific scene to the user;

(g) revising the coordinates of the specific scene, based on the coordinates of the specific user state that results from presenting the specific scene;

(h) after revising the coordinates of the specific scene, selecting a second scene, in the set of stored scenes, that is different than the specific scene and that has coordinates in the contextual control space which are then closer, by at least a second threshold amount, to the coordinates of the target state than are the coordinates of any other scene in the set of stored scenes, including the specific scene; and (i) presenting the second scene to the user.

17. The method of claim 16, wherein the input specifies that the coordinates of the target state are the coordinates, in the contextual control space, of a current user state, which current user state is a user state of the user when the input is accepted.

18. The method of claim 16, wherein the coordinates of the target state are different than coordinates, in the contextual control space, of a user state of the user when the input is accepted.

19. The method of claim 16, wherein the specific scene and the second scene, when presented to the user, each comprise:

(a) a video;

(b) an audio presentation; and (c) artificial illumination other than the video.

20. The method of claim 16, wherein:

(a) the at least two contextual control axes include a focus axis and a restoration axis;

(b) a coordinate on the focus axis is indicative of a degree to which a scene facilitates or is perceived to facilitate focus or of a degree to which focus occurs; and (c) a coordinate on the restoration axis is indicative of a degree to which a scene facilitates or is perceived to facilitate relaxation or of a degree to which relaxation occurs.

* * * * *